US007340421B1

(12) United States Patent
Marcial et al.

(10) Patent No.: US 7,340,421 B1
(45) Date of Patent: Mar. 4, 2008

(54) ACCOUNT RECONCILIATION METHODS AND SYSTEMS

(75) Inventors: William Marcial, Stamford, CT (US); William Charles Heinrich, Trumbull, CT (US); Richard Edward Fitzgerald, Fairfield, CT (US)

(73) Assignee: General Electric Company, Schenectady, NY (US)

( * ) Notice: Subject to any disclaimer, the term of this patent is extended or adjusted under 35 U.S.C. 154(b) by 158 days.

(21) Appl. No.: 09/747,908

(22) Filed: Dec. 22, 2000

(51) Int. Cl.
*G06Q 10/00* (2006.01)
(52) U.S. Cl. ...................................................... 705/30
(58) Field of Classification Search ............ 705/30–34, 705/40, 44
See application file for complete search history.

(56) References Cited

U.S. PATENT DOCUMENTS

| | | | |
|---|---|---|---|
| 4,910,696 A | 3/1990 | Grossman et al. | |
| 5,189,608 A * | 2/1993 | Lyons et al. | 705/30 |
| 5,193,055 A | 3/1993 | Brown et al. | |
| 5,517,406 A | 5/1996 | Harris et al. | |
| 5,704,044 A | 12/1997 | Tarter et al. | |
| 5,783,808 A | 7/1998 | Josephson | |
| 5,799,286 A * | 8/1998 | Morgan et al. | 705/30 |
| 5,991,750 A | 11/1999 | Watson | |
| 6,006,204 A * | 12/1999 | Malcolm | 705/30 |
| 6,021,202 A | 2/2000 | Anderson et al. | |
| 6,041,312 A | 3/2000 | Bickerton et al. | |
| 6,209,095 B1 | 3/2001 | Anderson et al. | |
| 6,212,280 B1 | 4/2001 | Howard, Jr. et al. | |
| 6,249,770 B1 * | 6/2001 | Erwin et al. | 705/10 |
| 6,275,813 B1 | 8/2001 | Berka | |
| 6,477,510 B1 * | 11/2002 | Johnson | 705/30 |
| 6,532,450 B1 * | 3/2003 | Brown et al. | 705/40 |
| 6,584,453 B1 * | 6/2003 | Kaplan et al. | 705/39 |
| 6,625,617 B2 * | 9/2003 | Yarnall et al. | 707/104.1 |
| 6,684,384 B1 * | 1/2004 | Bickerton et al. | 717/108 |
| 6,847,942 B1 * | 1/2005 | Land et al. | 705/30 |
| 2001/0044762 A1 * | 11/2001 | Nault | 705/30 |
| 2002/0111886 A1 * | 8/2002 | Chenevich et al. | 705/30 |
| 2002/0147668 A1 * | 10/2002 | Smith et al. | 705/30 |
| 2004/0059651 A1 * | 3/2004 | MaGuire et al. | 705/30 |
| 2004/0073500 A1 * | 4/2004 | Owen | 705/30 |
| 2005/0097016 A1 * | 5/2005 | Barnard et al. | 705/30 |

OTHER PUBLICATIONS

Hollander et al., Accounting, Information Technology, and Business Solutions, Second Edition, pp. 86-90, 427, and 463-464, 1999.*
Wilkinson et al., Accounting Information Systems, Fourth Edition, pp. 139-140, and 276, Sep. 9, 2000.*
Larson et al., Fundamentals of Accounting Principles, Richard D. Irwin Inc., 11th ed., pp. 258-262, 566-569, 1987.*

* cited by examiner

Primary Examiner—Gerald J. O'Connor
(74) Attorney, Agent, or Firm—Armstrong Teasdale, LLP

(57) ABSTRACT

Computer-based methods and systems for managing and tracking account reconciliation are described. The method includes accessing an account reconciliation system after logging onto the system, receiving account information from a centralized database, and submitting accounting entries to balance the account. A new account variance is then calculated and reported to a user based on pre-established criteria. In another aspect, a system for practicing the account reconciliation method is provided. The system includes at least one computer and server configured to read, receive, store input account information and compute account variances based on received information.

50 Claims, 22 Drawing Sheets

FIG. 14

| | A | B | C | D | E | F | G | H | I | J | K | L |
|---|---|---|---|---|---|---|---|---|---|---|---|---|
| 1 | | | TREASURY CA$H CURRENT ACCOUNT (440000444) RECONCILIATION SUBMISSION | | | | | | | | | |
| 2 | | | | | | | | | | | | |
| 3 | BSLA | VXXIEP | Fiscal Month | August | Contact Name | | Business Reconciliation Balance | | | | | |
| 4 | AffiliateBSLA | ADMBBB | Treasury Balance | $28,000,000.00 | Contact Phone | | Treasury Reconciliation Balance | | | | | |
| 5 | AccountNumber | 440000444 | Business Balance | ($33,000,000.00) | Number | | Reconciliation Variance | | | | | 310 |
| 6 | Description | ADMINISTRA | Variance | ($5,000,000.00) | | | | | | | | |
| 7 | Start of Month | 8/1/99 | | | | | | | | | | |
| 8 | | | | | | | | | | | | |
| 9 | | | | | | | | | | | | |
| 10 | Booked by | | | | Business | | | | | Treasury | | |
| 11 | Business | Booked by Treasury | Currency Code | Conversion Rate | Treasury Local Amount | | Description | TranDate | Treasury Journal | Source | Office | Legal Entity |
| 12 | | | | | | | | | | | | |

300

ROLLUP REPORT
Choice: COMMERCIAL REAL ESTATE ~342

| BSLA | # of items < than 30 days | net $ < than 30 days | # of items < than 60 and > than 30 days | net $ < than 60 days> than 30 days | # items < 90 days > than 60 days | net $ < than 90 days > than 60 days | # items < 120 days > than 90 days | net $ < 120 days > 90 days | # items < 180 days > 120 days | net $ < 180 days > 120 days | # of items > than 180 days | net $ > than 180 days | Total items | Total exposure |
|---|---|---|---|---|---|---|---|---|---|---|---|---|---|---|
| C6AASi | 0 | $0.00 | 0 | $0.00 | 0 | $0.00 | 0 | $0.00 | 0 | $0.00 | 0 | $0.00 | 0 | $0.00 |
| C6BAUD | 0 | $0.00 | 0 | $0.00 | 0 | $0.00 | 0 | $0.00 | 0 | $0.00 | 0 | $0.00 | 0 | $0.00 |
| C6CAAA | 0 | $0.00 | 0 | $0.00 | 0 | $0.00 | 0 | $0.00 | 0 | $0.00 | 0 | $0.00 | 0 | $0.00 |
| C6DDKK | 0 | $0.00 | 0 | $0.00 | 0 | $0.00 | 0 | $0.00 | 0 | $0.00 | 0 | $0.00 | 0 | $0.00 |
| C6FAAA | 0 | $0.00 | 0 | $0.00 | 0 | $0.00 | 0 | $0.00 | 0 | $0.00 | 0 | $0.00 | 0 | $0.00 |
| C6GARP | 0 | $0.00 | 0 | $0.00 | 0 | $0.00 | 0 | $0.00 | 0 | $0.00 | 0 | $0.00 | 0 | $0.00 |
| C6IAAA | 0 | $0.00 | 0 | $0.00 | 0 | $0.00 | 0 | $0.00 | 0 | $0.00 | 0 | $0.00 | 0 | $0.00 |
| C6JPY | 0 | $0.00 | 0 | $0.00 | 0 | $0.00 | 0 | $0.00 | 0 | $0.00 | 0 | $0.00 | 0 | $0.00 |
| C6LAAA | 0 | $0.00 | 0 | $0.00 | 0 | $0.00 | 0 | $0.00 | 0 | $0.00 | 0 | $0.00 | 0 | $0.00 |
| C6MMXP | 0 | $0.00 | 0 | $0.00 | 0 | $0.00 | 0 | $0.00 | 0 | $0.00 | 0 | $0.00 | 0 | $0.00 |
| C6PESP | 0 | $0.00 | 0 | $0.00 | 0 | $0.00 | 0 | $0.00 | 0 | $0.00 | 0 | $0.00 | 0 | $0.00 |
| C6SSEK | 0 | $0.00 | 0 | $0.00 | 0 | $0.00 | 0 | $0.00 | 0 | $0.00 | 0 | $0.00 | 0 | $0.00 |
| RREBBB | 0 | $0.00 | 0 | $0.00 | 0 | $0.00 | 0 | $0.00 | 0 | $0.00 | 0 | $0.00 | 0 | $0.00 |
| Total | 0 | $0.00 | 0 | $0.00 | 0 | $0.00 | 0 | $0.00 | 0 | $0.00 | 0 | $0.00 | 0 | $0.00 |

FIG. 16

CAPITAL CURRENT ACCOUNT — Current Account Reconciliation System

ROLLUP REPORT
GLOBAL CONSUMER FINANCE — 362

| BSLA | # items < than 60 days | net $ < than 60 days | # of items > than 60 days | net $ > than 60 days | Total items | Total exposure |
|---|---|---|---|---|---|---|
| BCACSK | 0 | $0.00 | 0 | $0.00 | 0 | $0.00 |
| BCFDKK | 0 | $0.00 | 0 | $0.00 | 0 | $0.00 |
| BCFNOK | 0 | $0.00 | 0 | $0.00 | 0 | $0.00 |
| BCFSWE | 0 | $0.00 | 0 | $0.00 | 0 | $0.00 |
| BCIINR | 0 | $0.00 | 0 | $0.00 | 0 | $0.00 |
| BCLAAA | 0 | $0.00 | 0 | $0.00 | 0 | $0.00 |
| BCLJPY | 0 | $0.00 | 0 | $0.00 | 0 | $0.00 |
| BCQAAA | 0 | $0.00 | 0 | $0.00 | 0 | $0.00 |
| BCXBRL | 0 | $0.00 | 0 | $0.00 | 0 | $0.00 |
| BCXCHF | 0 | $0.00 | 0 | $0.00 | 0 | $0.00 |
| BCXCSK | 0 | $0.00 | 0 | $0.00 | 0 | $0.00 |
| BCXDEM | 0 | $0.00 | 0 | $0.00 | 0 | $0.00 |
| BCXGMS | 0 | $0.00 | 0 | $0.00 | 0 | $0.00 |
| BCXINR | 0 | $0.00 | 0 | $0.00 | 0 | $0.00 |

Sidebar:
- Enter Cash Account Reconciliation
- Down/Upload Cash Account Recon
- Aging Analysis Detail Reports
- Aging Analysis Summary Reports
- Print Templates
- BSLA Variance
- Variance By Legal
- 440 Report
- Help
- Logout <- Go Back    Print

FIG. 17

CAPITAL CURRENT ACCOUNT — Current Account Reconciliation System

Report ID: AFF440-OCT
Ledger: Monthly
Period: 10

Corporate Data Repository
AFFILIATE RECONCILIATION BY ACCOUNT
440000444

Sidebar:
- Enter Cash Account Reconciliation
- Down/Upload Cash Account Recon
- Aging Analysis Detail Reports
- Aging Analysis Summary Reports
- Print Templates
- BSLA Variance
- Variance By Legal
- 440 Report
- Help
- Logout

| BSLA | Account | Afil | Name | Posted | BSLA | Affil | Name |
|---|---|---|---|---|---|---|---|
| ADCINR | 440000444 | ADCINR | ADMINISTRATI | -50,000.00 | ADCINR | ADCINR | CAPITAL MAR |
| ADIINR | 440000444 | ADMBBB | ADMINISTRATI | -90,000,000.00 | ADMBBB | ADIINR | INDIA - COR |
| ADIVE1 | 440000444 | ADMBBB | ADMINISTRATI | -700,000.00 | ADMBBB | ADIVE1 | INDIA PR |
| ADIVE1 | 440000444 | CININR | CEF INDIA | -6,000,000.00 | | | |
| | 440000444 | | | .00 | ADMBBB | ACCNLG | ITS-ACCESS |
| | 440000444 | | | .00 | ADMBBB | ACCUSD | ITS-ACCESS |
| | 440000444 | | | .00 | ADMBBB | ADDCNY | GEDALIAN - |
| | 440000444 | | | .00 | ADMBBB | ADMAUD | AUSTRALIA - |
| ADMBBB | 440000444 | ADMBBB | ADMINISTRATI | 900,000.00 | | | |
| ADMBBB | 440000444 | ADMBRL | CORPORATE BR | 50,000,000.00 | ADMBRL | ADMBBB | ADMINISTRAT |
| ADMBBB | 440000444 | ADMBRT | CAPITAL C | 200,000,000.00 | | | |
| ADMBBB | 440000444 | ADMCSH | CBSE-CASH MO | -70,000,000.00 | | | |
| ADMBBB | 440000444 | ADMGBP | ADMIN UK | 80,000,000.00 | ADMGBP | ADMBBB | ADMINISTRAT |
| ADMBBB | 440000444 | ADMHUF | BUDAPEST BAN | 30,000,000.00 | | | |
| ADMBBB | 440000444 | ADMIDR | ADMIN INDONE | 90,000,000.00 | ADMIDR | ADMBBB | ADMINISTRAT |
| ADMBBB | 440000444 | ADMMEX | CORPORATE ME | 500,000,000.00 | ADMMEX | ADMBBB | ADMINISTRAT |
| ADMBBB | 440000444 | ADMMXP | ALIANZA-MEXI | -20,000,000.00 | | | |
| ADMBBB | 440000444 | ADMTHB | ADMIN THAILA | 40,000,000.00 | ADMTHB | ADMBBB | ADMINISTRAT |
| ADMBBB | 440000444 | ADMUKL | LEEDS | -200,000,000.00 | ADMUKL | ADMBBB | ADMINISTRAT |
| ADMBBB | 440000444 | AFSTHB | AFS THAILAND | -50,000,000.00 | AFSTHB | ADMBBB | ADMINISTRAT |
| ADMBBB | 440000444 | AGEGBP | G BUSINESS | 3,000,000.00 | | | |
| ADMBBB | 440000444 | AMXUSD | AMERIC DOM | 100,000,000.00 | AMXUSD | ADMBBB | ADMINISTRAT |
| ADMBBB | 440000444 | ASELUF | PK Air finan | 80,000,000.00 | ASELUF | ADMBBB | ADMINISTRAT |
| ADMBBB | 440000444 | ASUUSD | AVIATION - D | 3,000,000,000.00 | ASUUSD | ADMBBB | ADMINISTRAT |

| | | | | | | | |
|---|---|---|---|---|---|---|---|
| CAPITAL CURRENT ACCOUNT | Current Account Reconciliation System | | | | | | |
| Enter Cash Account Reconciliation | Submission Information | | | | | | |
| Down/Upload Cash Account Recon | BSLA | Bsla Desc | Account Number | Affiliate BSLA | Legal Entity | Description | Balance1 | Balance2 | Variance |
| Aging Analysis Detail Reports | C3CCAA | Vendor Financial Services | 440000444 | ADMBBB | 001 | ADMINISTR | $1,000.00 | $0.00 | $1,000.00 |
| Aging Analysis Summary Reports | C3CCAA | Vendor Financial Services | 440000444 | ADMCNY | 351 | CANADIAN | $50,000,000.00 | ($40,000,000.00) | $10,000,000.00 |
| Print Templates | CGBGBP | Vendor Financial Services | 440000444 | ADMBBB | 001 | ADMINISTR | $4,000,000.00 | ($1,000,000.00) | $3,000,000.00 |
| BSLA Variance | CGBGBP | Vendor Financial Services | 440000444 | ADMBBB | 204 | ADMINISTR | ($100,000.00) | ($2,000,000.00) | ($2,100,000.00) |
| Variance By Legal | CGBGBP | Vendor Financial Services | 440000444 | ADMBBB | 058 | CEF-UK | $0.00 | ($100,000.00) | ($100,000.00) |
| 440 Report | CGEEUR | Vendor Financial Services | 440000444 | ADMBBB | 001 | ADMINISTR | ($30,000,000.00) | 2,000,000.00 | ($28,000,000.00) |
| Help | CGEEUR | Vendor Financial Services | 440000444 | ADMBBB | 112 | ADMINISTR | $10,000,000.00 | ($10,050,000.00) | ($50,000.00) |
| | CGEEUR | Vendor Financial Services | 440000444 | ADMBBB | 135 | ADMINISTR | ($27,000,000.00) | $22,000,000.00 | ($5,000,000.00) |
| | CGEEUR | Vendor Financial Services | 440000444 | ADMBBB | 204 | ADMINISTR | $1,000,000.00 | 30,000,000.00 | $31,000,000.00 |
| | CGEEUR | Vendor Financial Services | 440000444 | ADMBBB | 058 | ADMINISTR | $1,000,000.00 | $1,000,000.00 | $2,000,000.00 |
| | CGMDEM | Vendor Financial Services | 440000444 | ADMBBB | 001 | ADMINISTR | $490,000,000.00 | ($80,000,000.00) | $410,000,000.00 |
| Logout | CGMDEM | Vendor Financial Services | 440000444 | ADMBBB | 112 | ADMINISTR | ($150,000,000.00) | $200,000,000.00 | 50,000,000.00 |

ACCOUNT RECONCILIATION METHODS AND SYSTEMS

BACKGROUND OF THE INVENTION

This invention relates generally to account reconciliation and, more specifically, to computer-based methods and systems for account reconciliation.

Individual business units typically produce spreadsheet based accounting reports. The accounting spreadsheets are then submitted to a centralized operation, e.g. a treasury operation, for review. The centralized operation then manually contacts the individual businesses to reconcile any action plan they have reported.

Known account reconciliation methods have several disadvantages. For example, the current methods and systems are largely spreadsheet based. Multiple groups of employees conduct account reconciliation and the accuracy of the accounting depends on the experience and knowledge of the employees. In addition, using known methods and systems can be time consuming. Additionally, a business entity involved in managing multi-national operations deals with significant complexity in managing account reconciliation of each of the multi-national operations. Generally, in such a scenario, each of the operations manually completes their own reconciliation, mostly through spreadsheet software such as Excel®, and submits the completed documents to corporate treasury for review. (Excel is a registered trademark of Microsoft Corporation, Redmond, Wash.) Often, it is necessary to re-input the data to recreate the documents at the corporate level. Re-inputting data may expose the business entity to data integrity issues because of possible data entry errors. Furthermore, these additional steps take valuable time away from operations analysts which could have been spent on evaluating and analyzing actual reconciliation of accounts.

BRIEF SUMMARY OF THE INVENTION

In an exemplary embodiment, a computer-based method for account reconciliation is provided. The method includes accessing an account reconciliation system after logging onto the system with a user identification and a password, receiving account information from a centralized database, and submitting accounting entries to balance the account based on the received account information to the centralized database to reconcile account variances. A new account variance is then calculated and reported to a user based on pre-established criteria. Under the method, a user accesses the centralized database over an intranet or the Internet for account balance information thereby eliminating all manual intervention by an accounting department. The reporting of the new variances to a user permits the user to take appropriate measures.

In another aspect, a system for practicing the account reconciliation method is provided. The system includes at least one computer and server configured to read, receive, and store input account information. The server is further configured to calculate an account variance and report the account variance to a user. The system also includes a network connecting the server to the computer and a user interface that allows a requester to input account information and to receive account variance output.

BRIEF DESCRIPTION OF THE DRAWINGS

FIG. 14 is an exemplary embodiment of a user interface displaying details of a file when the user selects and double clicks file "VXXIEPADMBBB11112000122653.xlt" (shown in FIG. 13);

FIG. 16 is an exemplary embodiment of a Rollup Report;

FIG. 17 is an exemplary embodiment of a Rollup Report;

FIG. 19 is an exemplary embodiment of an Affiliate Reconciliation By Account Report;

FIG. 20 is an exemplary embodiment of a Submission Information Report;

DETAILED DESCRIPTION OF THE INVENTION

The present invention, in one aspect, is a computer-based method and system for account reconciliation.

Exemplary embodiments of systems and processes that facilitate integrated network-based electronic reporting and workflow process management related to account reconciliation are described below in detail. The systems and processes facilitate, for example, electronic submission of information using a client system, automated extraction of information, and windows-based assessment reporting.

The systems and processes are not limited to the specific embodiments described herein. In addition, components of each system and each process can be practiced independent and separate from other components and processes described herein. Each component and process also can be used in combination with other components and processes.

In one embodiment, the application resides on an IIS Server with a SQL Server 7.0 database. In an exemplary embodiment, the application is web-enabled and is run on a business entity's intranet. In yet another embodiment, the application is accessible by individuals having an authorized access outside the firewall of the business entity through the Internet. In a third exemplary embodiment, the application is run in a Windows NT environment. The application is flexible and designed to run in various environments.

Figure 1:
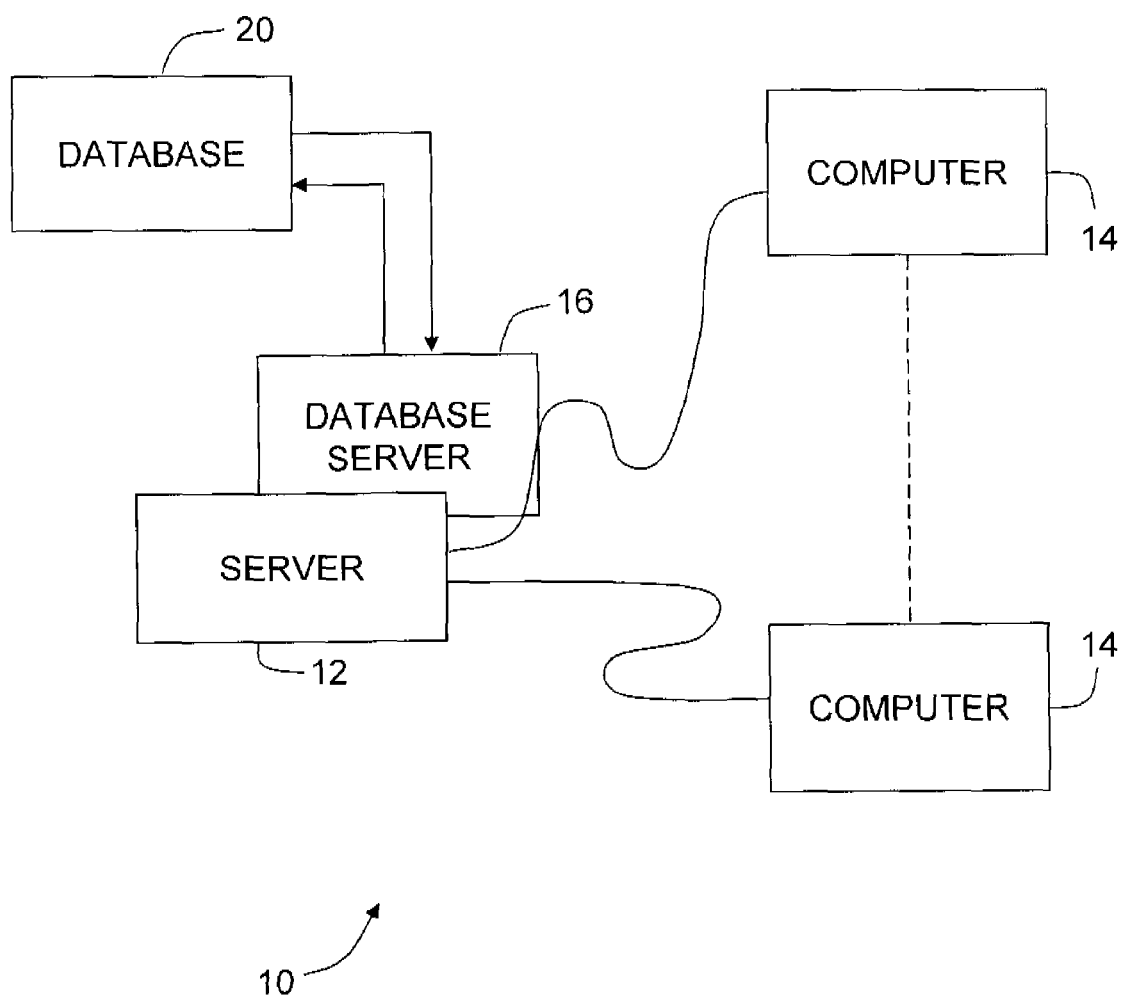
FIG. 1 is a simplified block diagram of an Account Reconciliation System (ARS) for tracking various account reconciliations.

FIG. 1 is a simplified block diagram of an Account Reconciliation System (ARS) 10 for tracking various account reconciliations. System 10 includes a server system 12 and a plurality of client systems 14 connected to server system 12. In one embodiment, client systems 14 are computers including a web browser, and server system 12 is accessible to client systems 14 via the Internet. Client systems 14 are interconnected to the Internet through many interfaces including a network, such as a local area network (LAN) or a wide area network (WAN), dial-in-connections, cable modems and high-speed ISDN lines. In another embodiment, client systems 14 could be any device capable of interconnecting to the Internet including a web-based telephone or other web-based connectable equipment. A database server 16 is connected to a centralized database 20 containing accounts and sub-accounts related information of a variety of different subsidiaries or businesses. Server system 12 can be accessed by potential users at one of client systems 14 by logging onto server system 12 through one of client systems 14.

Figure 2:
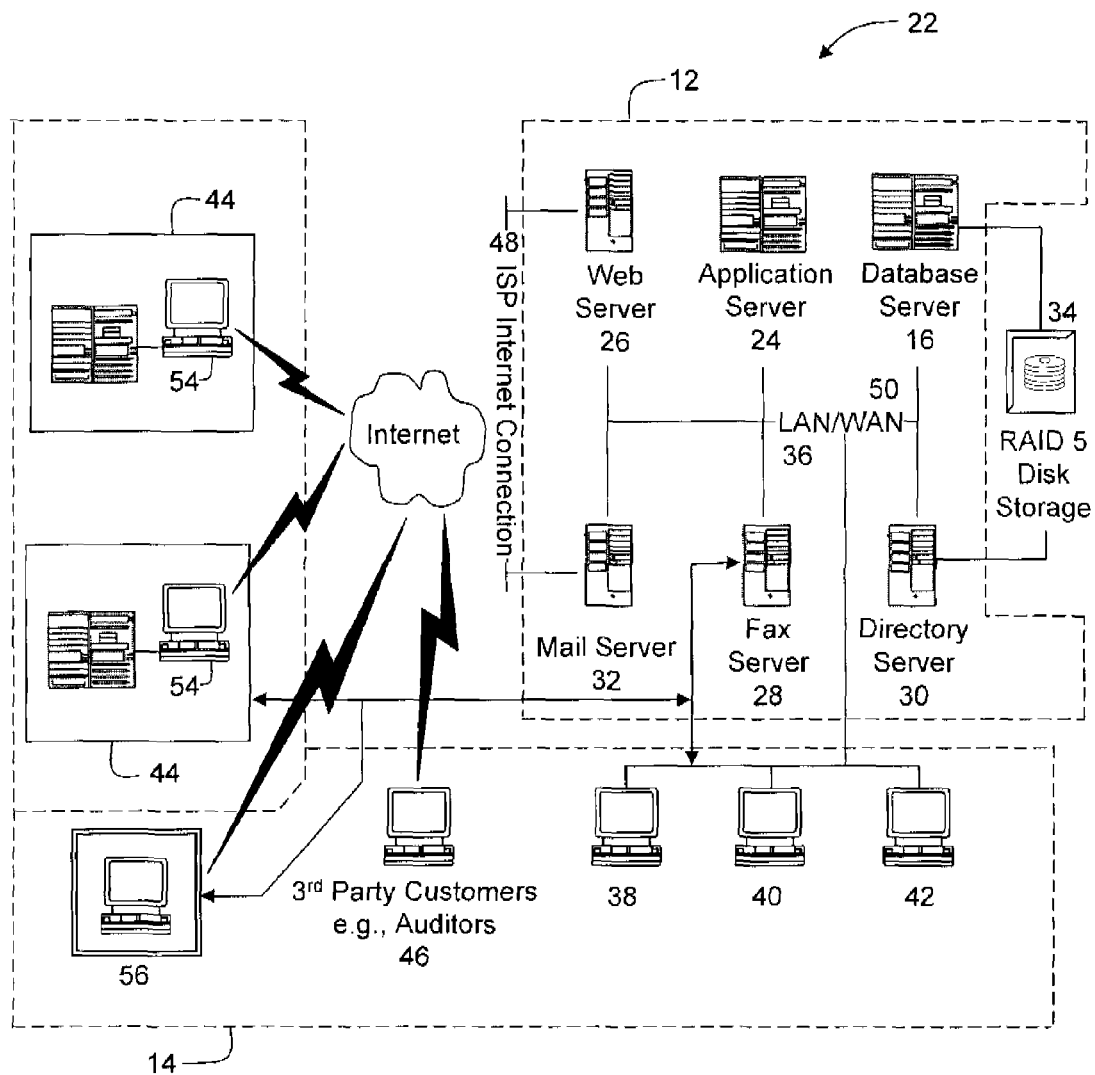
FIG. 2 is an expanded version block diagram of an exemplary embodiment of server architecture of the ARS.

Server 12 is configured to read, receive and store input account information and calculate an account variance. Account information includes any information relating to an account. Account information includes, but is not limited to account balance information and account reconciliation information. Server 12 is further configured for reporting the account variance to the user. The interface allows the user or applicant to input account information and to receive account variance output. FIG. 2 is an expanded version block diagram of an exemplary embodiment of a server architecture of an Account Reconciliation System (ARS) 22. Components in system 22, identical to components of system 10 (shown in FIG. 1), are identified in FIG. 2 using the same reference numerals as used in FIG. 1. System 22 includes a server system 12 and client system 14. Server system 12 includes a database server 16 and further includes an application server 24, a web server 26, a fax server 28, a directory server 30, and a mail server 32. A disk storage unit 34 is coupled to database server 16 and directory server 30. Servers 16, 24, 26, 28, 30, and 32 are coupled in a local area network (LAN) 36. In addition, a system administrator's workstation 38, a user or accounting analyst's workstation 40, and a supervising officer's workstation 42 are coupled to LAN 36. Alternatively, workstations 38, 40, and 42 are coupled to LAN 36 via an Internet link or are connected through an intranet.

Each workstation, 38, 40, and 42 is a personal computer including a web browser. Although the functions performed at the workstations typically are illustrated as being performed at respective workstations 38, 40, and 42, such functions can be performed at one of many personal computers coupled to LAN 36. Work stations 38, 40, and 42 are illustrated as being associated with separate functions only to facilitate an understanding of the different types of functions that can be performed by individuals having access to LAN 36.

In another embodiment, server system 12 is configured to be communicatively coupled to various subsidiaries 44 of a business entity and to third parties, e.g., internal or external auditors 46 via an ISP Internet connection 48. The communication in the exemplary embodiment is illustrated as being performed via the Internet, however, any other wide area network (WAN) 50 type communication can be utilized in other embodiments, i.e., the systems and processes are not limited to being practiced via the Internet. In addition, and rather than a WAN, a local area network could be used in place of the WAN.

In the exemplary embodiment, each subsidiary 44 of a business entity has a workstation 54. One of the client systems includes a senior manager's workstation 56 located at a remote location or located overseas. Workstations 54 and 56 are personal computers including a web browser. Also, workstations 54 and 56 are configured to communicate with server system 12. Furthermore, fax server 28 communicates with outside banks 44 and any of the remotely located client systems including a client system 56 via a telephone link. Fax server 28 is configured to communicate with other client systems 38, 40, and 42 as well.

Figure 3:
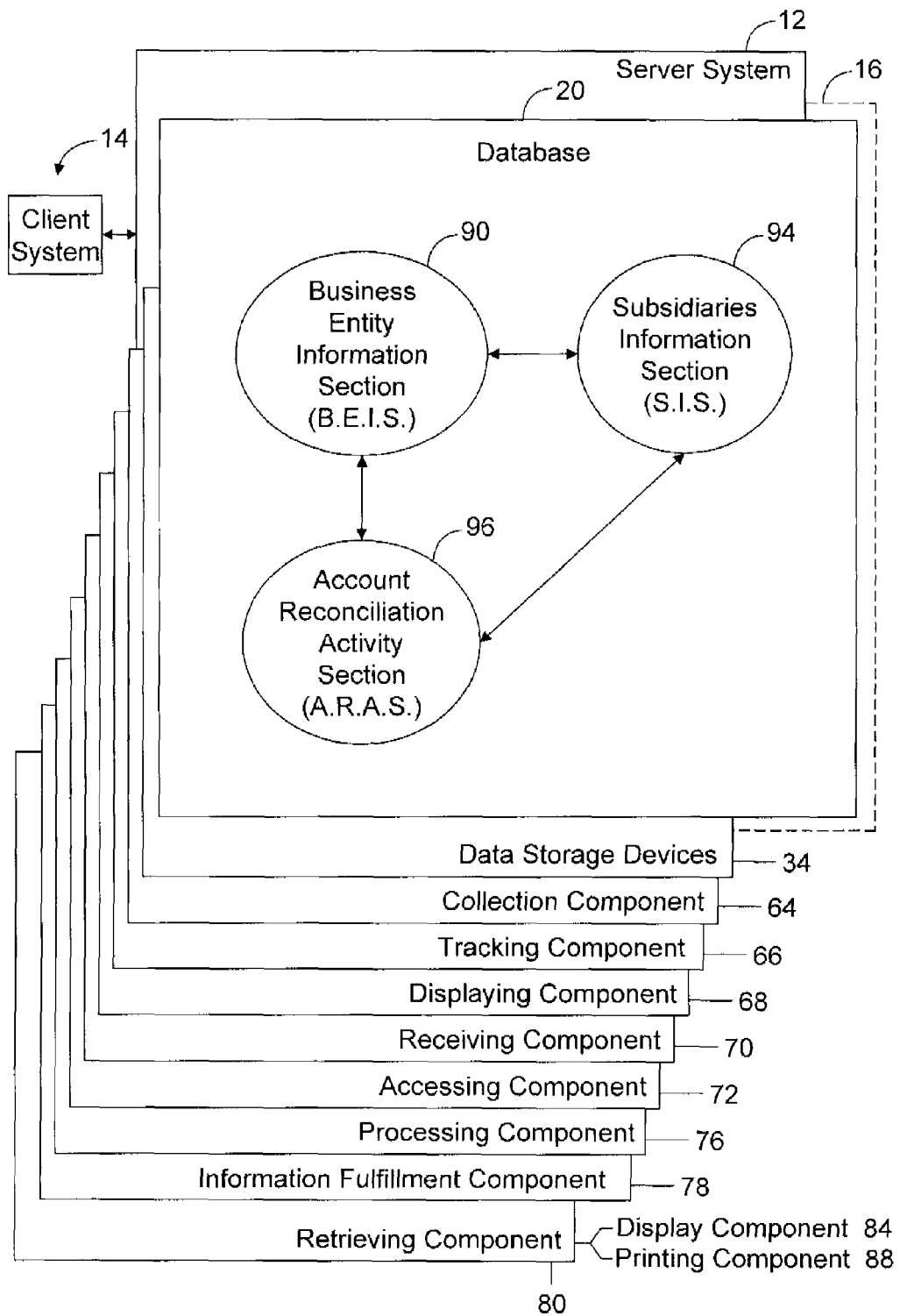
FIG. 3 shows a configuration of the database within a database server of the server system shown in FIG. 1.

FIG. 3 shows a configuration of database 20 within database server 16 of server system 12 shown in FIG. 1. Database 20 is coupled to several separate components within server system 12, which perform specific tasks.

Server system 12 includes a collection component 64 for collecting information from users into centralized database 20, a tracking component 66 for tracking information, a displaying component 68 to display information, a receiving component 70 to receive a specific query from client system 14, and an accessing component 72 to access centralized database 20. Receiving component 70 is programmed for receiving a specific query from one of a plurality of users. Server system 12 further includes a processing component 76 for searching and processing received queries against data storage device 34 containing a variety of information collected by collection component 64. An information fulfillment component 78, located in server system 12, downloads the requested information to the plurality of users in the order in which the requests were received by receiving component 70. Information fulfillment component 78 downloads the information after the information is retrieved from data storage device 34 by a retrieving component 80. Retrieving component 80 retrieves, downloads and sends information to client system 14 based on a query received from client system 14 regarding various alternatives.

Retrieving component 80 further includes a display component 84 configured to download information to be displayed on the client system's graphical user interface and a printing component 88 configured to print information.

Retrieving component 80 generates various reports requested by the user through client system 14 in a predetermined format. System 10 is flexible to provide various alternative types of reports and is not constrained to particular options set forth in any particular embodiment.

ARS 10 is a searchable database 20 built in a SQL server, which is divided into three main sections that interconnect. The first section is a Business Entity Information Section (BEIS) 90, also referred to as a Parent Information Section. BEIS 90 contains all relevant information about the parent corporation. Information may include a name of the person making accounting entries at the corporate location, a person in-charge of the system, a date and time entries are made, where the information is stored, whom to contact for additional information, and other relevant information. The second section is a Subsidiaries Information Section (SIS) 94. SIS 94 contains all relevant information pertaining to various subsidiaries. SIS 94 further includes information on subsidiary location, a name of the person making accounting entries at the corporate location, a person in-charge of the system, a date and time entries are made, where the information is stored, whom to contact for additional information, currency of the country where the subsidiary is located, and various sub-accounts and their classifications. The third section is an Account Reconciliation Activity Section (ARAS) 96. ARAS 96 stores information pertaining to each account, each sub-account of each account, any variance for a given account between the parent and its subsidiary, a date on which account entries were made, and other related historical information that may help reconcile the account, as well as help understand the discrepancy between the accounts of parent and subsidiaries. Updating information within one section also automatically updates the relevant information in other sections of the database to maintain database integrity.

The architectures of system 10 as well as various components of system 10 are exemplary only. Other architectures are possible and can be utilized in connection with practicing the processes described below. ARS 10 identifies and manages account variances between a business entity (parent corporation) and its subsidiaries. Cash movement between the business entity (parent corporation) and its subsidiaries are recorded by an accounting system (not shown). A batch process normally runs at the end of each day which extracts all business and subsidiary daily activities. A series of programs are executed to create account specific files which are then viewed by subsidiaries. Subsidiaries verify their general ledger bookings against parent bookings to determine variances. A process, also known as a reconciliation process, is undertaken to address variances. Account variances between the parent corporation and subsidiaries are created for various reasons attributed to accounting methods, business methods and processes related to booking accounting entries.

Figure 4:
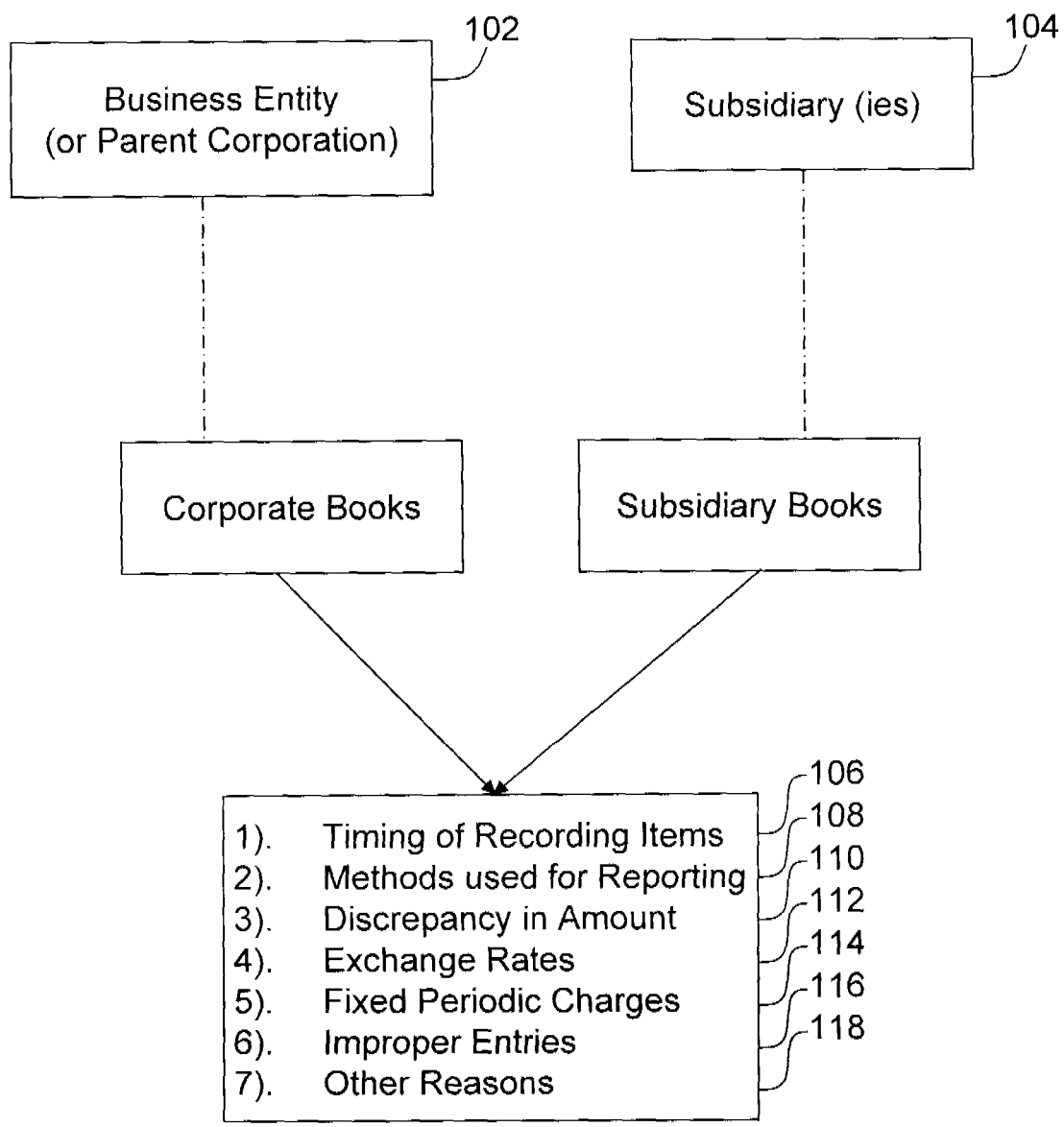
FIG. 4 elaborates on the reasons and needs for reconciliation of inter-company balances between a business entity (also referred to as a parent corporation) and a subsidiary of the parent corporation.

FIG. 4 depicts the reasons for reconciliation of inter-company balances between a business entity (also referred to as a parent corporation) 102 and a subsidiary 104 of the parent corporation. The inter-company discrepancies arise because of: Timing of Recording Items 106, Methods Used for Reporting 108, Discrepancy In Amount 110, Exchange Rates 112, Fixed Periodic Charges 114, Improper Entries 116, and Other Reasons 118.

1. Timing of Recording Items 106. There may be a time lag between the time that the parent corporation records the inter-company receivable/payable and the time that the business office (subsidiary) records it. During the interim period, a variance exists. The time lag can arise due to a delay in the flow of paper work, batch recording on certain dates, improper instructions, and other factors.

2. Methods Used for Reporting 108. If one entity reports the transaction when incurred and the other reports it based on the actual inflow or outflow of cash, there will be a variance. Even if both entities use a cash method, there can be a variance in the account balances if there is a time lag between the cash outflow from one entity and its actual receipt by the other.

3. Discrepancy In Amount 110. It is possible that different amounts may be reported by the two entities, which again leads to a variance. This can arise due to human error, misunderstanding, or other reason including fraud, conversion or intentional manipulation of accounts.

4. Exchange Rates 112. For a foreign subsidiary, even though the base amount is accurate, it may cause a variance if the two entities use different exchange rates.

5. Fixed Periodic Charges 114. The parent corporation may frequently allocate a certain overhead or charge a management fee to the subsidiary. This entry may be either completely missed by the entity or recorded late. Either way, there will be a variance.

6. Improper Entries 116. In the case of a large number of subsidiaries, often there can be accounting errors in which an item may get recorded against an incorrect subsidiary's account. In that case, both subsidiaries will have a variance.

7. Other Reasons 118. Often there are other reasons specific to the parent corporation and its subsidiary which create inter-company account variances. These reasons are analyzed and addressed by respective managers and corrected as appropriate.

Figure 5:
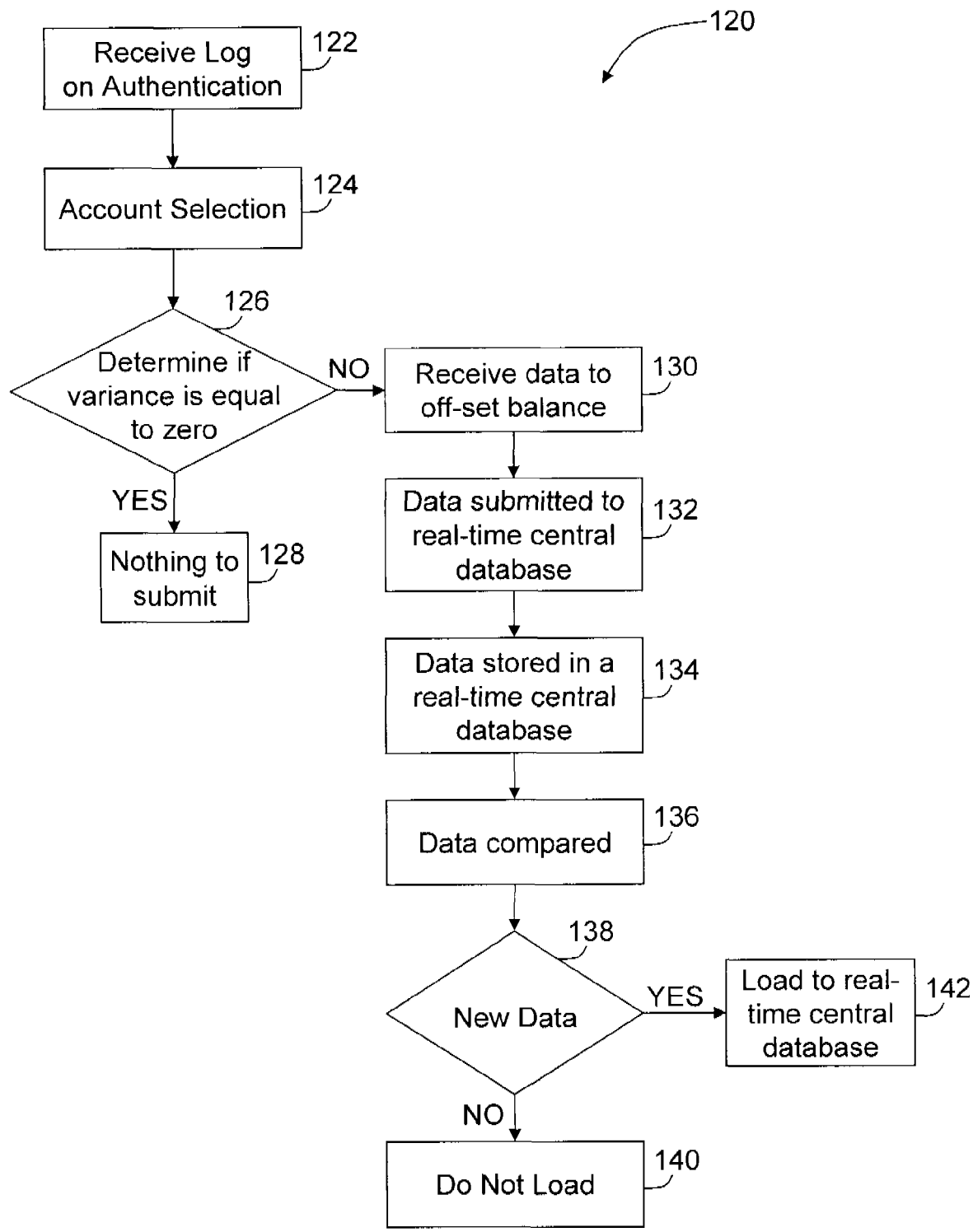
FIG. 5 is a flow chart for process steps executed in one embodiment of the present invention.

An account variance is calculated by any known means of calculating the account variance. FIG. 5 is a flow chart 120 for process steps executed in one embodiment of the present invention. More specifically, system 10 (shown in FIG. 1) receives 122 log on authentication from a system 10 user. Log on authentication includes, but is not limited to profile information which includes the user's name and a password. After the user has been authenticated, system 10 permits the user to access accounts which the user has authorization to access. Next, a specific account is selected 124 by the user. System 10 then retrieves the information existing about the specific account on the business entity's (parent corporation) accounting books, compares the information against the information available on subsidiary's books, and determines 126 if the variance is equal to zero. If the variance is equal to zero, nothing is submitted 128 to system 10. If the account variance is not zero, i.e. if there is an outstanding balance, system 10 receives 130 data from a user to off-set the balance. The information received by the system includes additional entries that the user is expected to post, and has not posted to the system based on the generally accepted accounting standards. If the standards in a particular country are different than the standards in the United States, the system provides guidelines to the user. Next, data or information is submitted 132 and stored 134 to a real-time central database. The data is then compared 136 to existing data to ensure that the data is not redundant and meets the accounting standard guidelines. If the data is not determined to be new data 138, it is not loaded 140 into system 10. If the data is determined to be new data 138, it is loaded 142 into the central database of system 10.

In an alternative embodiment, system 10 (shown in FIG. 1) receives and stores a log on authentication that includes profile information and analyzes the profile information for restricted access. It may be beneficial to restrict access to system 10 for security reasons. For example, a subsidiary of the business unit may be restricted to viewing only account reconciliation information to its own subsidiary. Profile information includes, but is not limited to, business unit information, customer contact information, and role information.

Figure 6:
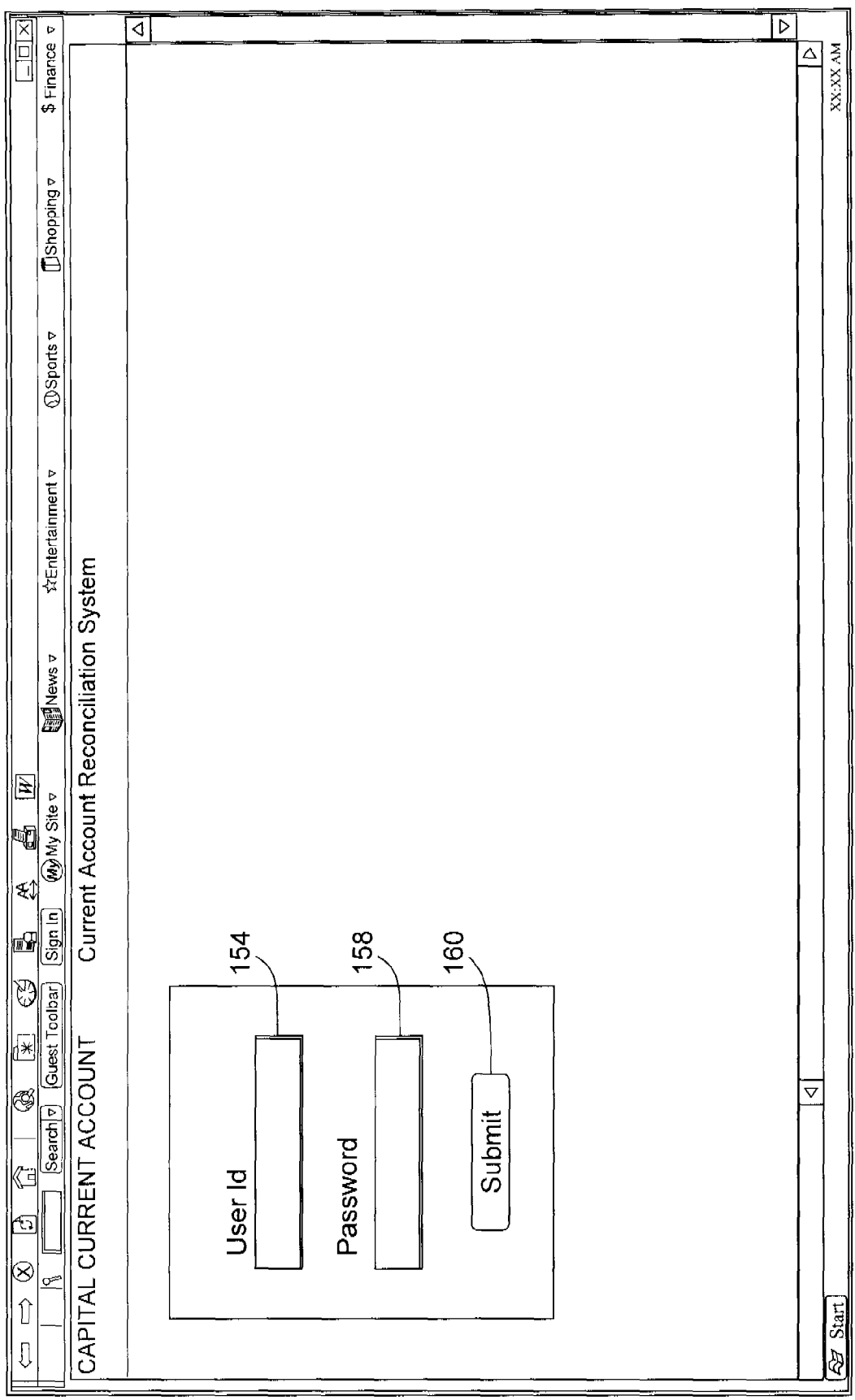
FIG. 6 is an exemplary embodiment of a home page downloaded and displayed by the server system when the user accesses the system by following certain specified steps.

FIG. 6 is an exemplary embodiment of a home page 150 downloaded and displayed by server system 12 when the user accesses the system by following certain specified steps. The user enters a user name 154 and a password 158 and submits the information to server system 12 for processing by selecting a "Submit" button 160. In an alternative embodiment, a "Cancel" button (not shown) permits the user to re-submit the information by clearing the inputted information. If the user name 154 and password 158 are incorrect, the system denies the access and requests the user to re-input the information.

Figure 7:
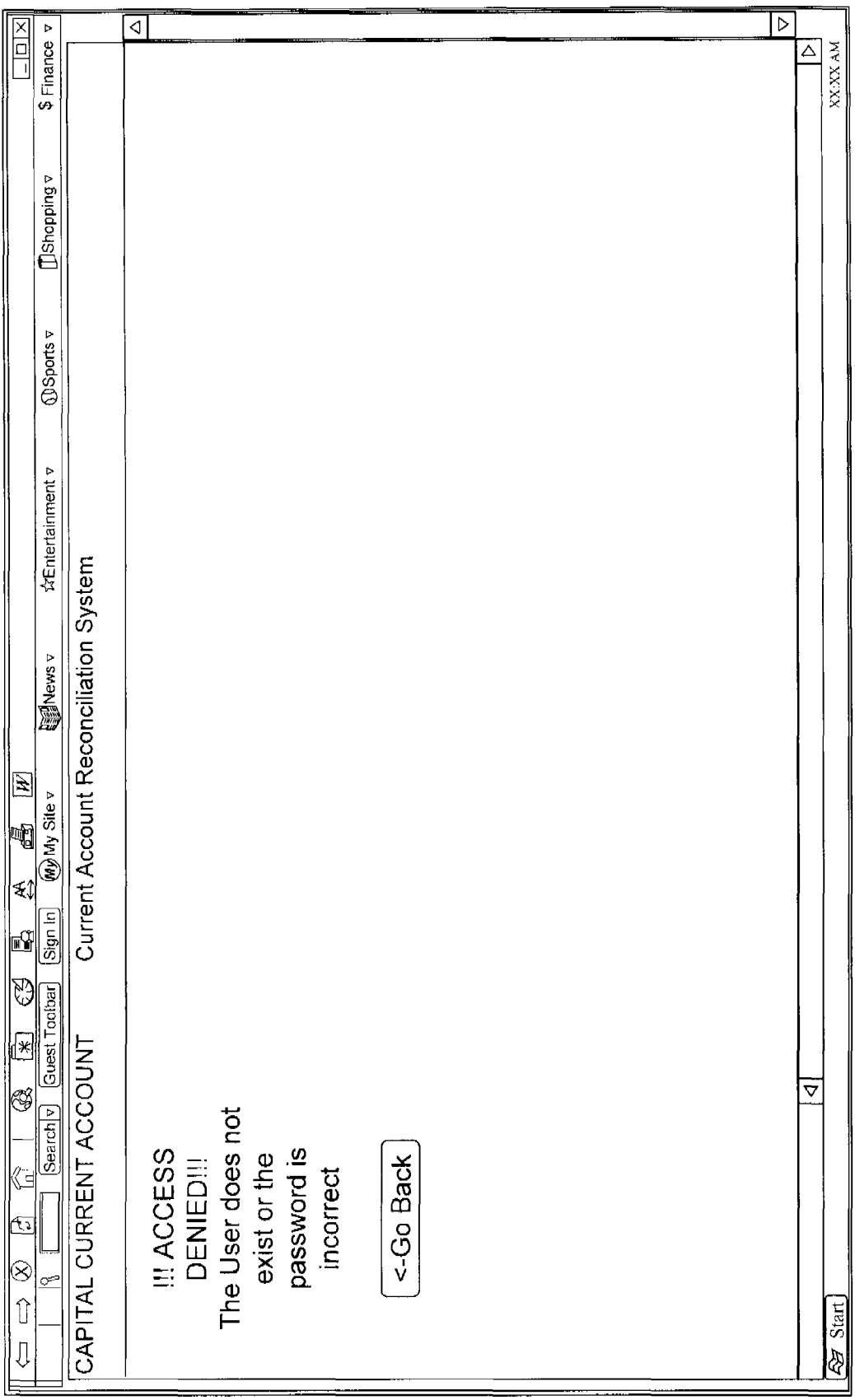
FIG. 7 is an exemplary embodiment of a user interface displaying the message to the user that the access has been denied and that the user should try again.

FIG. 7 is an exemplary embodiment of a user interface 166 displaying a message to the user that their access has been denied and that the user should try again. If user name 154 and password 158 (shown in FIG. 5) are correct, server system 12 downloads and displays a user interface shown in FIG. 7.

Figure 8:
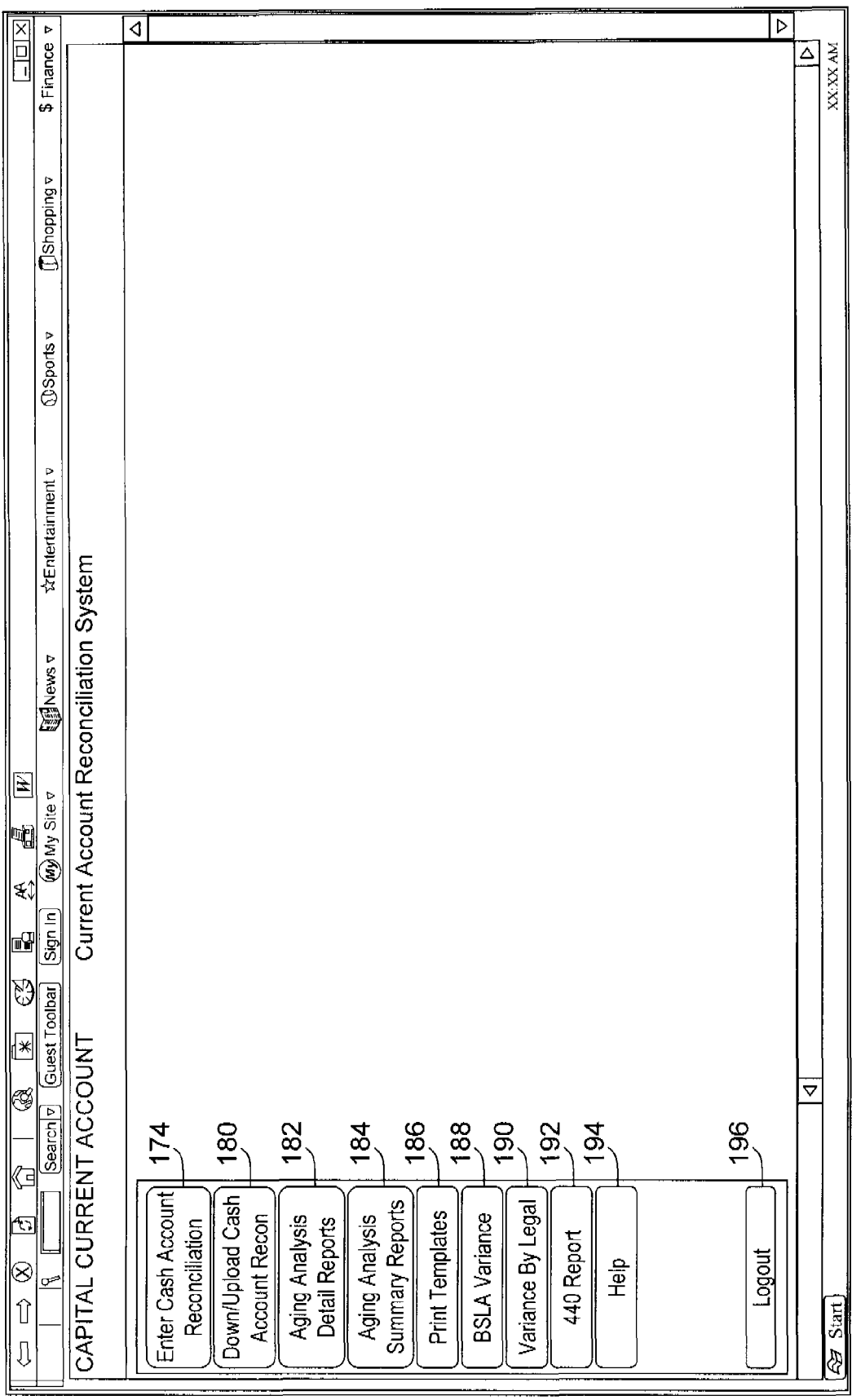
FIG. 8 is an exemplary embodiment of a user interface displaying two separate hypertext links to insert the information.

FIG. 8 is an exemplary embodiment of a user interface 170 displaying various hypertext links to input as well as retrieve the information. "Enter Cash Account Reconciliation" 174 hypertext link allows the user to directly input the required information relating to accounts through a web-site. "Down/Upload Cash Account Reconciliation" 180 permits the user to input information using computer files by downloading these files first and uploading the revised files later to update the system. Retrieving information is accomplished either by retrieving information on the user interface, or retrieve information through downloading various reports. System 10 provides reporting capability through hypertext links or individual buttons to receive Aging Analysis Details Reports 182, Aging Analysis Summary Reports 184, Print Templates 186, a BSLA Variance 188, Variance By Legal 190, and 440 Report 192. A Help 194 button provides assistance to the user on key features of the current account reconciliation system. Appendix A includes a copy of the User's Manual that is currently utilized by the users when the user selects the Help button while utilizing the system. A Logout 196 button helps the user to logout of the system.

Figure 9:
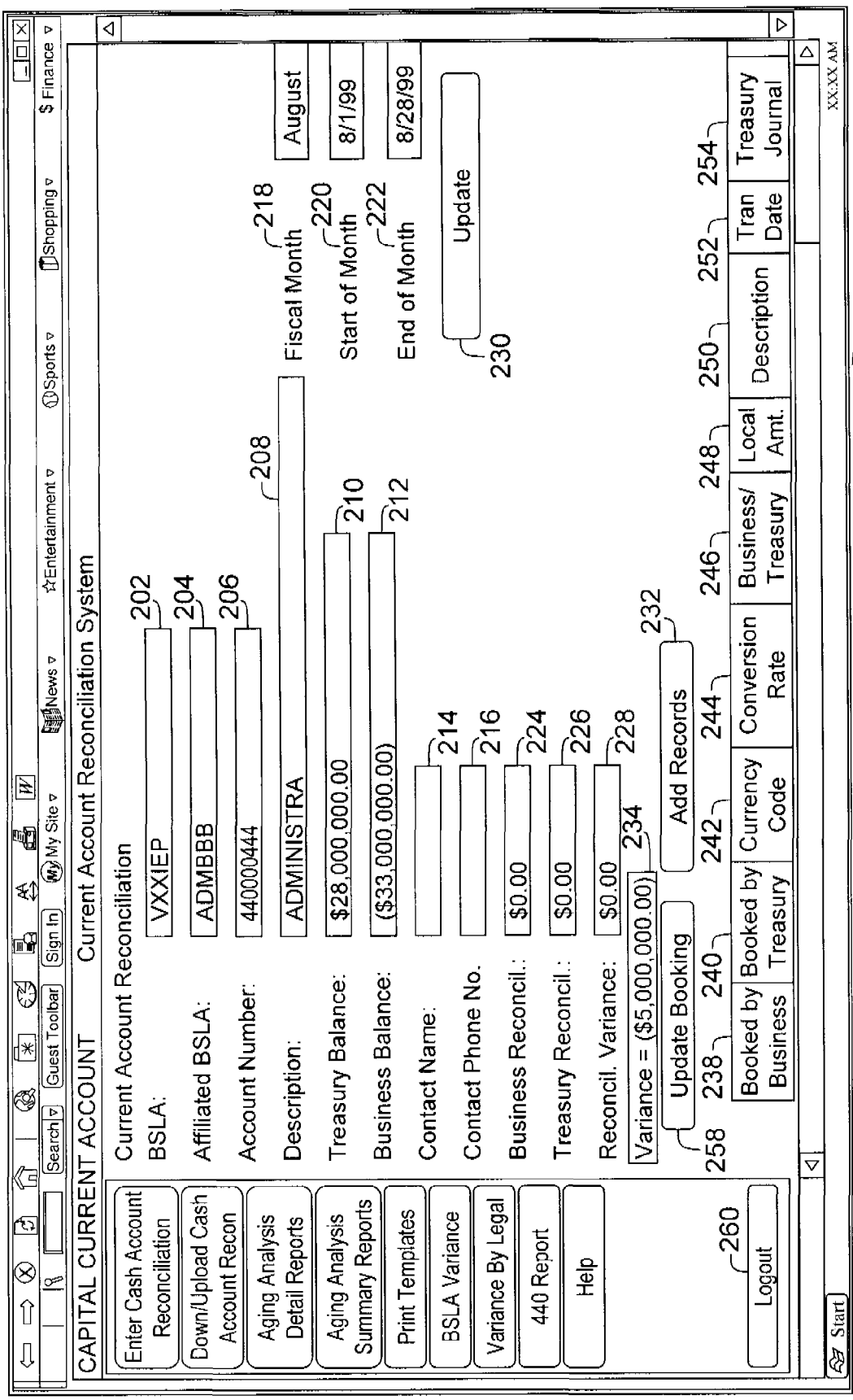
FIG. 9 is an exemplary embodiment of a user interface downloaded and displayed by the server system when the user has selected Enter Cash Account Reconciliation hypertext link (shown in FIG. 8)

FIG. 9 is an exemplary embodiment of a user interface 200 downloaded and displayed by server system 12 when the user has selected Enter Cash Account Reconciliation 174 hypertext link (shown in FIG. 8). User interface 200 displays a BSLA 202, an affiliate BSLA 204, an Account Number 206, a Description of the Account 208, a Treasury Balance 210 indicating the treasury balance booked by the parent corporation, a Business Balance 212 indicating the amount booked by a subsidiary of the parent corporation, a Contact Name 214 of the BSLA selected if there are any issues that need to be resolved, a Contact Phone Number 216 of the contact name, a Fiscal Month 218 including a start date 220 of the fiscal month and an end date 222 of the fiscal month. Once the user selects a specific BSLA 202 and an affiliate BSLA 204, system 10 downloads and displays corresponding information relating to the BSLA. The downloaded information also includes Business Reconciliation Balance 224, Treasury Reconciliation Balance 226, and a Reconciliation Variance 228. System 10 also activates an Update 230 button to permit the user to change the data displayed on user interface 200. The user has an option to add records by selecting an Add Records 232 button. Selecting add records button 232 displays a new row in a table format for the user.

In an exemplary embodiment, user interface 200 displays that there is a variance 234 of $5,241,921.61 displayed on user interface 200. Once the user selects Add Records button 232, the system downloads and displays a row displaying several column headings 236. These columns allow the user to input a dollar amount Booked by Business (subsidiary) 238, a dollar amount Booked by Treasury (of a parent corporation) 240, a Currency Code 242, a Conversion Rate 244, an identification associated with a Business/Treasury 246, a Local Amount 248, a Description 250, a Transaction Date 252, and an amount identified in Treasury Journal 254. The user is also allowed to input a Treasury Source (shown in FIG. 10) relating to the treasury journal, a code for an Office (shown in FIG. 10) and a Legal Entity (shown in FIG. 10). In an exemplary embodiment, each of these fields are pre-defined in terms of a length and an input format. Booked by Business (subsidiary) 238 and Transaction Date 252 are necessary before the user enters the data into other fields. Once the user moves from one field to the other, the previous record in database 20 is automatically updated. If the user attempts to update the other fields without completing transaction date field 252, the user is reminded to complete the transaction field.

Once the user has completed the information for one row and moves to the next row, system 10 automatically updates variance 234 by adding the amount introduced in Booked by Business (subsidiary) 238 to the current variance. System 10 also updates database 20 with a new set of information including additional accounting entries. If the user decides to update any of the administrative information such as Contact Name 214 of the BSLA selected, or Contact Phone Number 216 of the contact name, the user simply needs to change the data in a respective field and select Update button 230. If the user wants to update the information pertaining to a particular book information through user interface 200, the user may do so by simply changing the information on user interface 200 and selecting an Update Booking button 258. Update Booking button 258 instantaneously updates database 20. Once the user has completed data entries to update books and adjust variances, the user has an option to logout of the system by selecting a Logout button 260.

Figure 10:
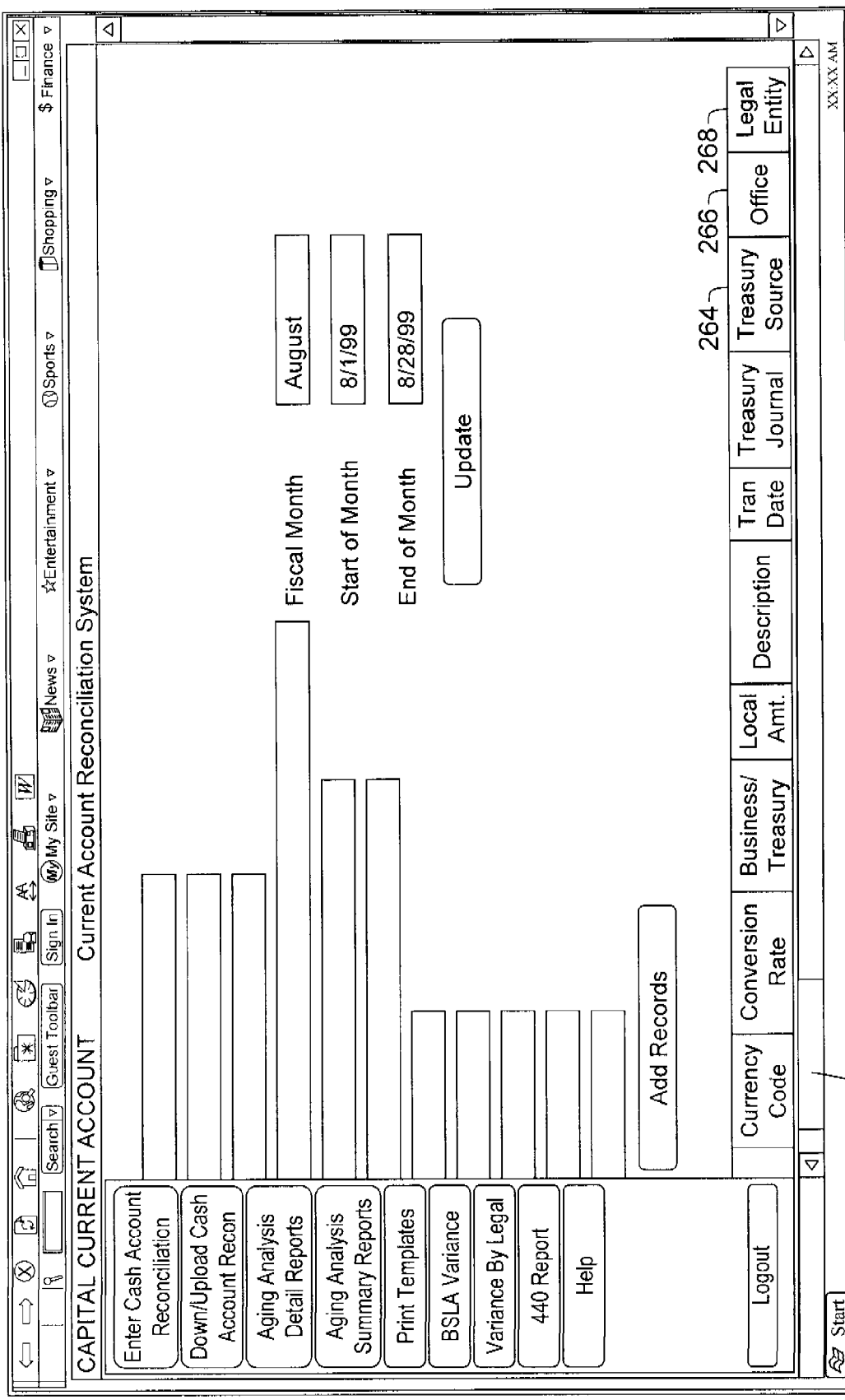
FIG. 10 is an exemplary embodiment of a continuation user interface of the user interface displayed in FIG. 9.

FIG. 10 is an exemplary embodiment of a continuation user interface 262 of user interface 200 (shown in FIG. 9) downloaded and displayed by server system 12 when the user has selected Enter Cash Account Reconciliation 174 hypertext link (shown in FIG. 8). Continuation user interface 262 displays a Treasury Source 264 relating to the treasury journal, a code for an Office 266 and a Legal Entity 268. In an exemplary embodiment, each of these fields are pre-defined in terms of a length and an input format. The user accesses fields 264, 266 and 268 by utilizing a scroll bar 270.

Figure 11:
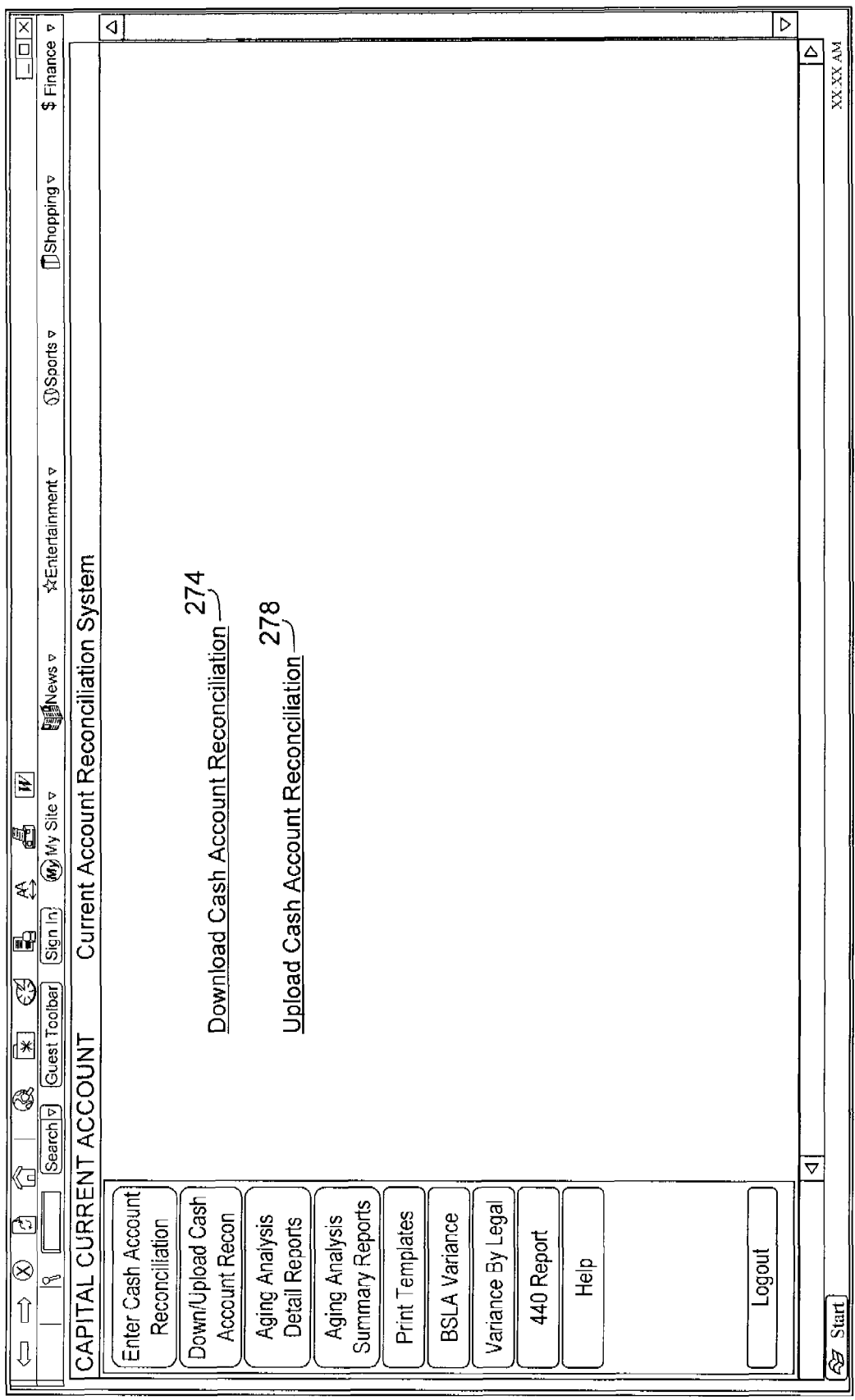
FIG. 11 is an exemplary embodiment of a user interface downloaded and displayed by the server system when the user has selected Down/UpLoad Cash Account Reconciliation (shown in FIG. 8)

FIG. 11 is an exemplary embodiment of a user interface 272 downloaded and displayed by server system 12 when the user has selected Down/Upload Cash Account Reconciliation 180 (shown in FIG. 8). User interface 272 provides the user with an alternative way of updating records which involves creating files by downloading information and then uploading the updated information into server system 12. As the files are being downloaded, server system 12 displays a message informing the user of the downloading progress (shown in FIG. 12). Downloading files is accomplished by selecting a hypertext link entitled "Download Cash Account Reconciliation" 274, which in essence creates the required files. After the downloaded files are updated with the new data, the downloaded files are updated using an "Upload Cash Account Reconciliation" 278 button.

Figure 12:
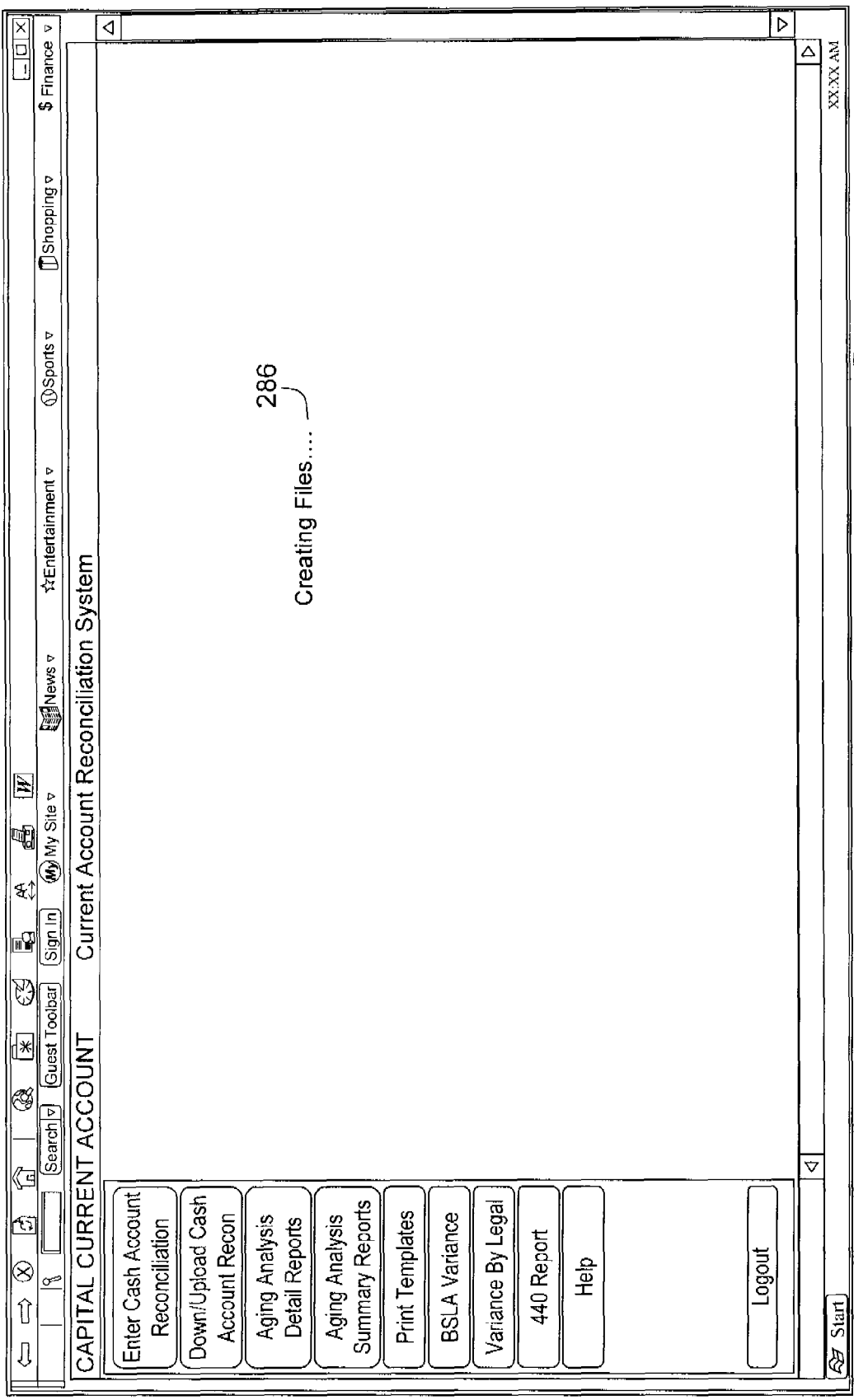
FIG. 12 is an exemplary embodiment of a user interface displaying a message to the user by the server system when the user has selected Download Cash Account Reconciliation hypertext link (shown in FIG. 11)

FIG. 12 is an exemplary embodiment of a user interface 284 displaying a message 286 to the user by server system 12 when the user has selected Download Cash Account Reconciliation 274 (shown in FIG. 11). User interface 284 displays a message to the user that the system is creating files and that the user should not perform any functions in the interim.

Figure 13:
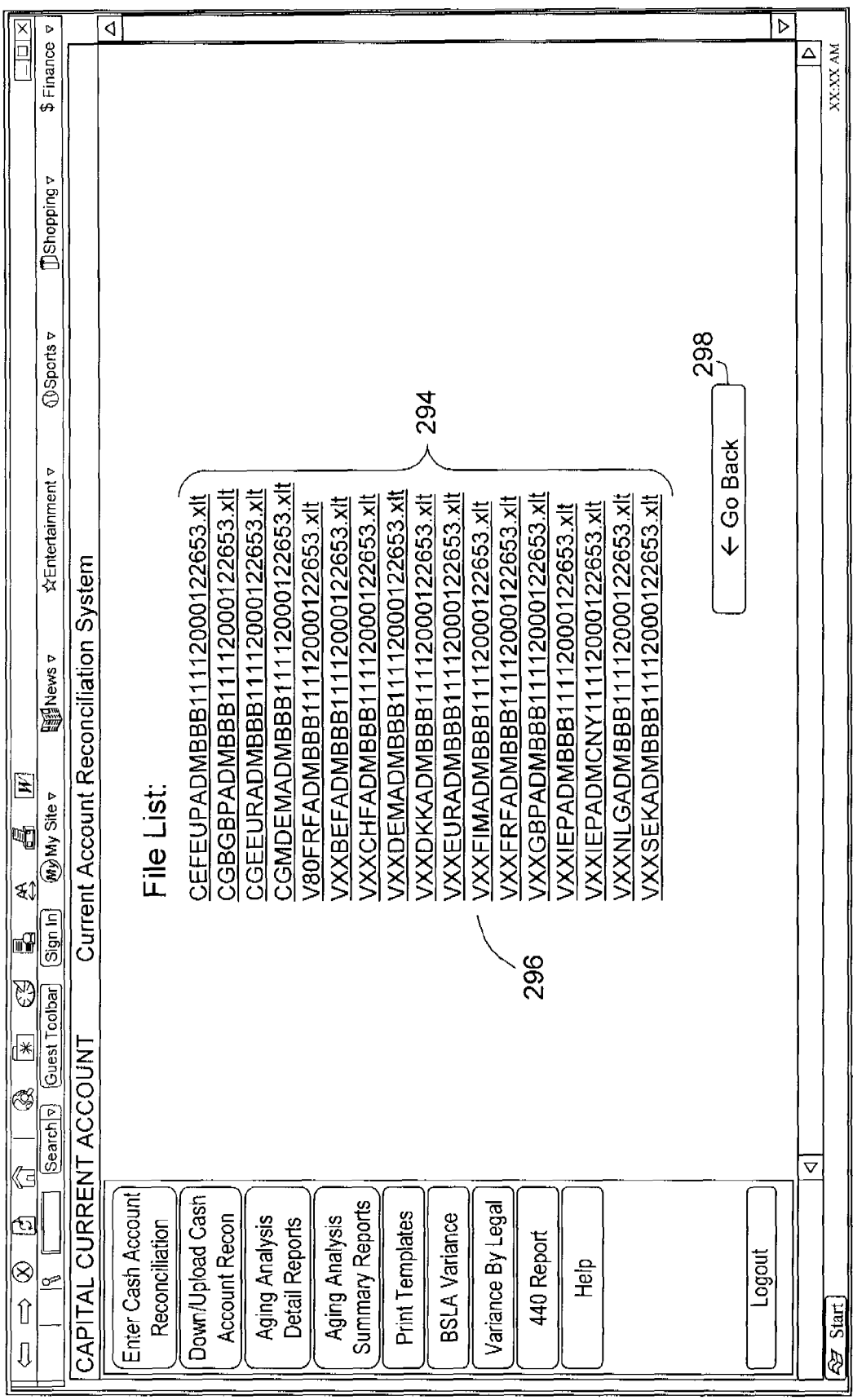
FIG. 13 is an exemplary embodiment of a user interface displaying a list of files downloaded by the server system when the user has selected Download Cash Account Reconciliation hypertext link (shown in FIG. 11)

FIG. 13 is an exemplary embodiment of a user interface 290 displaying a list of files 294 downloaded by server system 12 when the user has selected Download Cash Account Reconciliation 274 (shown in FIG. 11). The list of files includes all the files relating to a specific BSLA. In an exemplary embodiment, server system 12 downloads and displays 17 separate files in a specific format, each format similar to a file "VXXIEPADMBBB11112000122653.xlt" 296. The user may access details of any of these files by selecting a file and double clicking the same. Selection of a "Go Back" button 298 results in server 12 transmitting to user device 14 the menu (shown in FIG. 11).

FIG. 14 is an exemplary embodiment of a user interface 300 displaying details of a file when the user selects and double clicks on file "VXXIEPADMBBB11112000122653.xlt" 296 (shown in FIG. 13). The details are displayed through a spreadsheet program. The details displayed contain the same type of information displayed on user interface 200 (shown in FIG. 9). The user adds the necessary information relating to the affiliate on the spreadsheet in two separate rows 310. After the information is verified for accuracy, the user uploads the updated information by selecting "Upload Cash Account Reconciliation" 278 (shown in FIG. 11).

Figure 15:
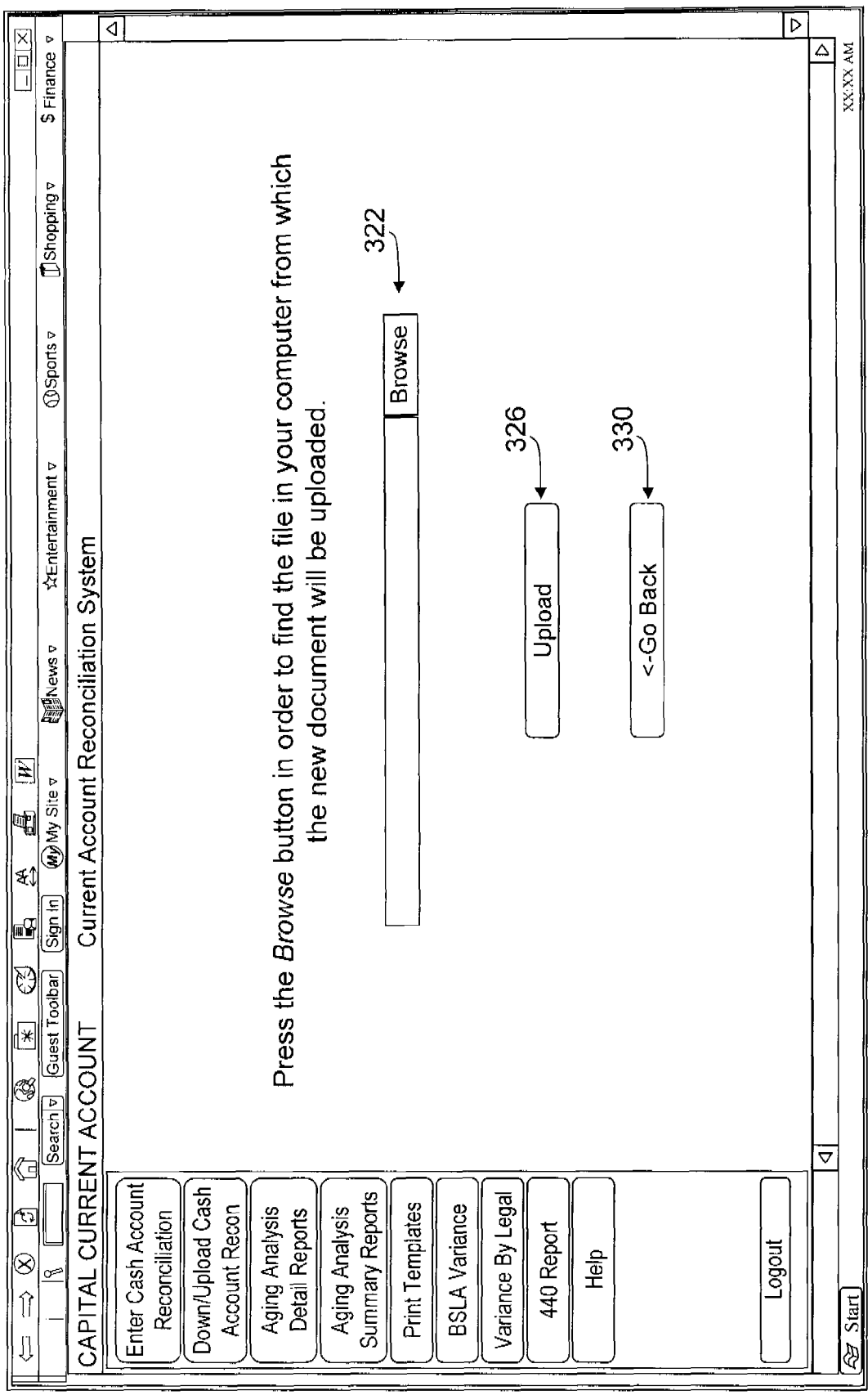
FIG. 15 is an exemplary embodiment of a user interface facilitating the upload process.

FIG. 15 is an exemplary embodiment of a user interface 318 facilitating an upload process. Through user interface 318, the user selects a browse button 322 to locate the file on the user's computer from which the new document will be uploaded. The dialog box (not shown) appears listing all possible files. System 10 permits the user to select a specific file to be uploaded. Once the file is selected, the user selects an upload button 326 to upload the file to server system 12. System 10 displays a message to the user after the selected files are successfully uploaded. A "Go Back" button 330 takes the user back to user interface 300 (shown in FIG. 14).

FIG. 16 is an exemplary embodiment of a Rollup Report 340. Rollup report 340 provides aging analysis for a business entity 342. Report 340 is downloaded and displayed when the user selects "Aging Analysis Detail Reports" 182 button (shown in FIG. 8). Report 340 provides detail breakdown for business entity 342 in a 30-day increment period. A Print 346 option allows the user to print the report. A Go Back 350 button takes the user back to user interface 318 (shown in FIG. 15).

FIG. 17 is an exemplary embodiment of a Rollup Report 360. Rollup report 360 provides aging analysis for a business entity 362. Report 360 is downloaded and displayed when the user selects "Aging Analysis Summary Reports" 184 button (shown in FIG. 8). Report 360 provides detail breakdown for business entity 362 for less than 60-day period. Report 360 provides a number of reconciling items 366 for less than 60-days period and a net dollars 368 associated with these items for a given BSLA 370. Report 360 further identifies a total number of reconciling items 374 and a total exposure 378 in dollars for BSLA 370. A Print 380 option allows the user to print the report. A Go Back 384 button takes the user back to user interface 318 (shown in FIG. 15).

Figure 18:
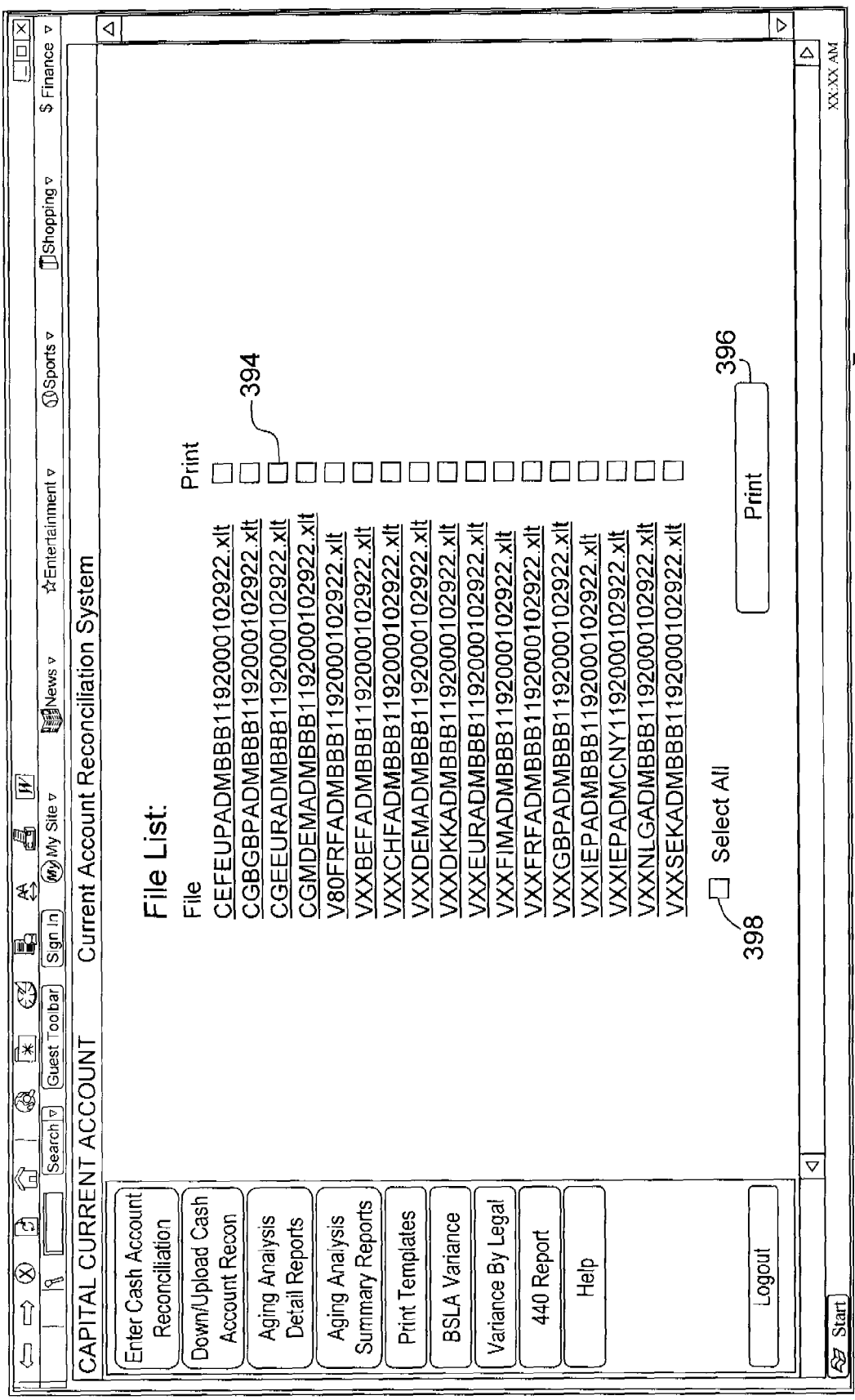
FIG. 18 is an exemplary embodiment of a File List Report.

FIG. 18 is an exemplary embodiment of a File List Report 390. File List Report 390 provides printing functionality to the user. After the business has submitted the reconciling information, a specific report can be printed by selecting a box 394 identifying the report and selecting a Print button 396. If the user wishes to print all the reports, the user can select a "Select All" 398 box before selecting print button 396.

FIG. 19 is an exemplary embodiment of an Affiliate Reconciliation By Account Report 400. Report 400 provides BSLA Variance. Report 400 is downloaded and displayed when the user selects "BSLA Variance" button 188 (shown in FIG. 8). Report 400 shows variance balances at a higher level.

FIG. 20 is an exemplary embodiment of a Submission Information Report 420. Submission Information Report 420 provides comparison between the Balance 1 (treasury balance) 424 maintained at a corporate level and a Balance 2 (business balance) 426 maintained by the business for a given BSLA 430, a BSLA Account Number 432 and a Legal Entity 434. A Print option (not shown) allows the user to print the report. Submission Information Report 420 is downloaded and displayed when the user selects "Variance By Legal" button 190 (shown in FIG. 8).

Figure 21:
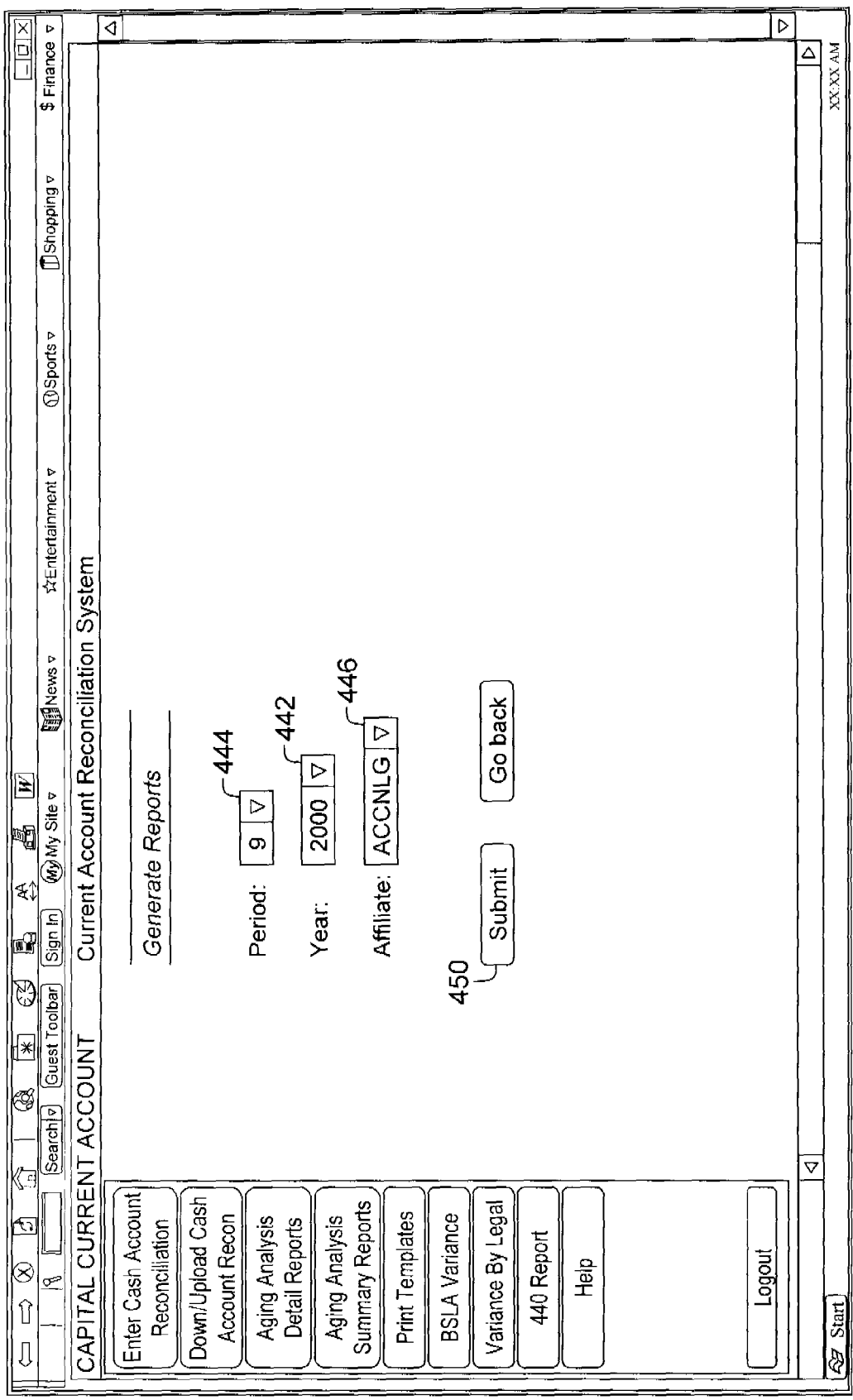
FIG. 21 is an exemplary embodiment of a user interface that facilitates generating a specific report.

FIG. 21 is an exemplary embodiment of a user interface 440 that facilitates generating a specific report. User interface is downloaded and displayed when the user selects "440 Report" hypertext link 192 shown in FIG. 8. Through user interface 440, the user selects a year 442, a month or a period 444, and an affiliate account number 446 for which the user wishes to print a report. The information is submitted through a plurality of pull down menus. Once the information is identified, the user submits the information by selecting a "Submit" button 450.

Figure 22:
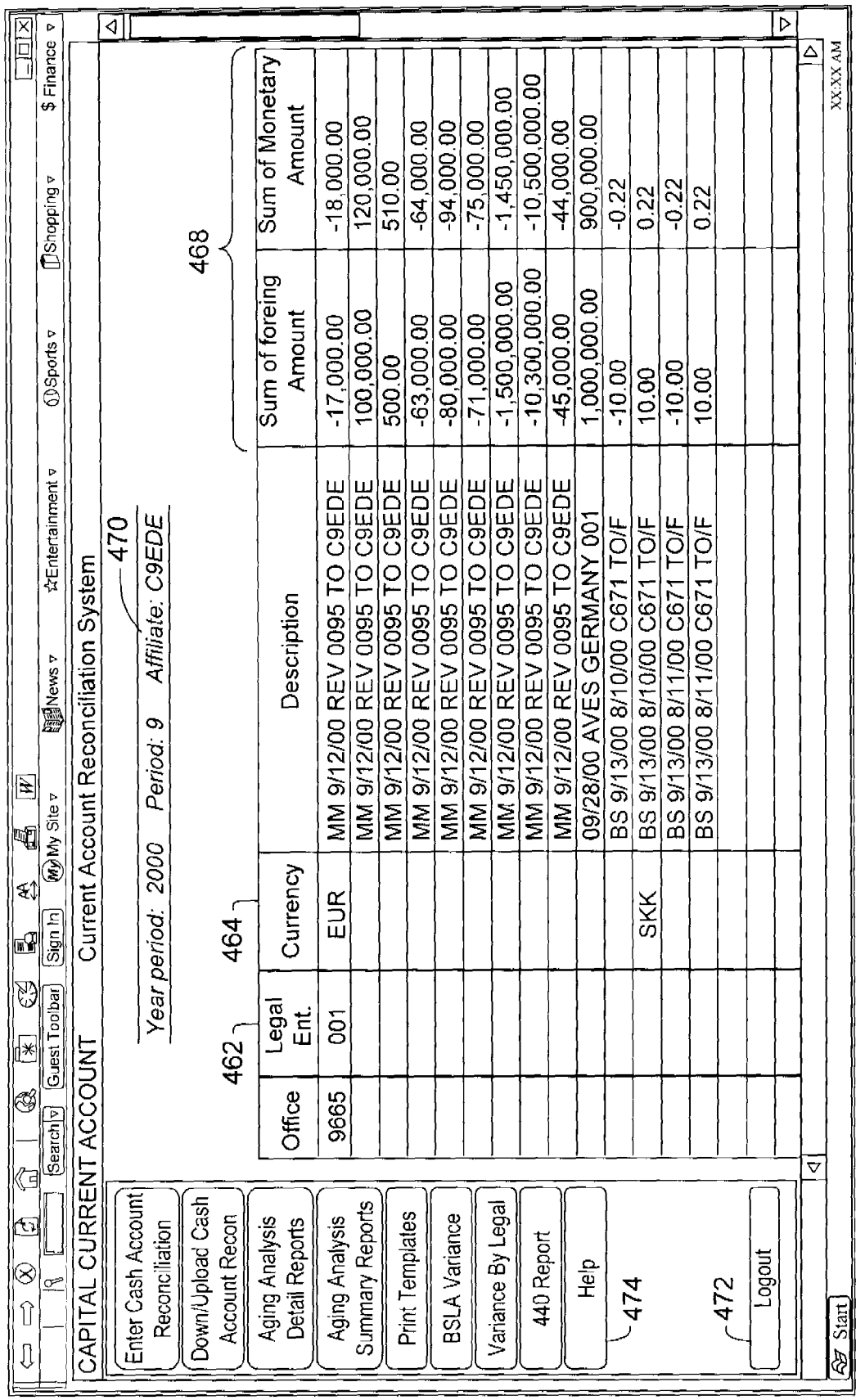
FIG. 22 is an exemplary embodiment a 440 Report downloaded and displayed on the user interface when the user submits the requested information by selecting a Submit button (shown in FIG. 21).

FIG. 22 is an exemplary embodiment of a 440 Report downloaded and displayed on the user interface when the user submits the requested information by selecting "Submit" button 450 (shown in FIG. 21). A report 460 shown in FIG. 22 displays a legal entity 462, a currency 464, a brief description 466, and a list of entries 468 posted on the treasury ledger for a specific affiliate 470. Logout button 472 logs the user out of the system. The user has an option to download the User Manual by selecting a "Help" hypertext link 474.

While the invention has been described in terms of various specific embodiments, those skilled in the art will recognize that the invention can be practiced with modification within the spirit and scope of the claims.

What is claimed is:

1. A system for account reconciliation between a parent business entity and a subsidiary of the parent business entity, said system comprising:

at least one remote computer associated with the subsidiary, the subsidiary computer configured to prompt a user associated with the subsidiary to enter account data relating to business activities of the subsidiary;

at least one remote computer associated with the parent, the parent computer configured to prompt a user associated with the parent to enter account data relating to business activities of the subsidiary;

a centralized database for storing account information including account data maintained by the parent relating to business activities of the subsidiary, account data maintained by the subsidiary relating to the business activities of the subsidiary, and variance data showing differences between the parent account data and the subsidiary account data; and a server associated with the parent in communication with each of the subsidiary computer, the parent computer and the centralized database, the server programmed to:

receive the parent maintained account data from the parent computer;

receive the subsidiary maintained account data from the subsidiary computer;

calculate an account variance based on the parent maintained account data and the subsidiary maintained account data;

report the account variance to a user associated with the subsidiary by displaying on the subsidiary computer the account variance, an amount booked by the parent, and an amount booked by the subsidiary;

display a data entry table on the subsidiary computer for prompting the user associated with the subsidiary to input additional accounting entries for reconciling the reported account variance;

display on the subsidiary computer guidelines to assist the user associated with the subsidiary to input the additional accounting entries in the displayed data table, wherein the specific guidelines displayed depend upon accounting standards applicable to the parent and accounting standards applicable to the subsidiary and whether any differences exist between the applicable accounting standards including whether differences in accounting standards exist due to the parent and subsidiary being located in different countries, and wherein the guidelines relate to at least one of a timing of recording items including whether there are time lags between a time when the parent records an account receivable or an account payable associated with the subsidiary and a time when the subsidiary records the same account receivable or account payable, methods used for reporting account information including whether the parent account data and the subsidiary account data are based on a cash basis or an accrual basis, a discrepancy in an amount, exchange rates used by the parent and subsidiary, whether at least one of an overhead charge and a management fee has been charged to the subsidiary by the parent, and whether there have been any improper entries charged to the subsidiary;

reconcile the account variance by processing the additional accounting entries inputted into the data entry table relating to the business activities of the subsidiary;

automatically compare the additional accounting entries to the account data stored in the database to determine whether any of the additional accounting entries are duplicative of the account data stored in the database;

automatically update the account variance and the amount booked by the subsidiary as displayed on the subsidiary computer based on the additional, non-duplicative accounting entries; and update the account information stored in the database based on the additional, non-duplicative accounting entries.

2. A system according to claim 1 wherein said server is configured to automatically submit the account information to an account tracking application.

3. A system according to claim 1 wherein said server is configured to receive information by at least one of the Internet, an intranet, a wide area network and a local area network.

4. A system according to claim 1 wherein said server is configured to prompt a user associated with the subsidiary to input into the subsidiary computer account information including at least one of an amount booked by the subsidiary, an amount booked by the parent, a currency code, a conversion rate, a local amount, a transaction date, and an amount identified in a journal of the parent.

5. A system according to claim 1 wherein said server is configured to receive and store profile information.

6. A system according to claim 5 wherein said server is further configured to analyze the profile information for restricted access.

7. A system according to claim 1 wherein said server is configured to calculate an account variance using a predefined algorithm.

8. A system according to claim 1 wherein said server is configured to receive and store reconciliation information.

9. A network-based system for managing accounts reconciliation between a parent business entity and a subsidiary of the parent business entity, said system comprising:

at least one remote sub-system associated with the subsidiary, the subsidiary sub-system comprising a browser and configured to prompt a user associated with the subsidiary to enter account data relating to business activities of the subsidiary;

at least one computer associated with the parent, the parent computer programmed to prompt a user associated with the parent to enter account data relating to business activities of the subsidiary;

a data storage device for storing account information including account data maintained by the parent relating to business activities of the subsidiary, account data maintained by the subsidiary relating to the business activities of the subsidiary, and variance data showing differences between the parent maintained account data and the subsidiary maintained account data; and a server sub-system associated with the parent and in communication with each of the subsidiary sub-system, the parent computer, and said database, said server sub-system programmed to:

receive the parent maintained account data from the parent computer;

receive the subsidiary maintained account data from the subsidiary sub-system;

calculate an account variance based on the parent maintained account data and the subsidiary maintained account data;

report the account variance to a user associated with the subsidiary by displaying on the subsidiary sub-system the account variance, an amount booked by the parent, and an amount booked by the subsidiary;

display a data entry table on the at least one subsidiary sub-system for prompting the user associated with the subsidiary to input additional accounting entries for reconciling the reported account variance;

display on the at least one subsidiary sub-system guidelines to assist the user associated with the subsidiary to input the additional accounting entries in the displayed data table, wherein the specific guidelines displayed depend upon accounting standards applicable to the parent and accounting standards applicable to the subsidiary and whether any differences exist between the applicable accounting standards including whether differences in accounting standards exist due to the parent and subsidiary being located in different countries, and wherein the guidelines relate to at least one of a timing of recording items including whether there are time lags between a time when the parent records an account receivable or an account payable associated with the subsidiary and a time when the subsidiary records the same account receivable or account payable, methods used for reporting account information including whether the parent account data and the subsidiary account data are based on a cash basis or an accrual basis, a discrepancy in an amount, exchange rates used by the parent and subsidiary, whether at least one of an overhead charge and a management fee has been charged to the subsidiary by the parent, and whether there have been any improper entries charged to the subsidiary;

reconcile the account variance by processing the additional accounting entries inputted into the data entry table relating to the business activities of the subsidiary;

automatically compare the additional accounting entries to the account data stored in the data storage device to determine whether any of the additional accounting entries are duplicative of the account data stored in the data storage device;

automatically update the account variance and the amount booked by the subsidiary as displayed on the subsidiary sub-system based on the additional, non-duplicative accounting entries; and update the account information stored in the data storage device and the account variance based on the additional, non-duplicative accounting entries.

10. A system according to claim 9 wherein said subsidiary sub-system is further configured with:

a displaying component to display available options to the user associated with the subsidiary; and a sending component to send an inquiry to the server sub-system so that the server sub-system can process and download the requested information to the subsidiary sub-system.

11. A system according to claim 10 wherein said server sub-system is further configured to prompt a user associated with the subsidiary to input into the at least one subsidiary sub-system account information including at least one of an amount booked by the subsidiary, an amount booked by the parent, a currency code, a conversion rate, a local amount, a transaction date, and an amount identified in a journal of the parent.

12. A system according to claim 11 wherein the sending component functions in response to a voice command.

13. The client system of claim 9 wherein said system is further configured to be protected from access by unauthorized individuals.

14. A system according to claim 9 wherein said server sub-system is further configured with:

a collection component for collecting information from users into the centralized database;

a tracking component for tracking information on an on-going basis;

a displaying component for displaying information;

a receiving component for receiving an inquiry from the subsidiary sub-system; and an accessing component for accessing the centralized database and causing the retrieved information to be displayed on the subsidiary sub-system.

15. A system according to claim 14 wherein said server sub-system further configured with a receiving component for receiving an inquiry to provide information from one of a plurality of users.

16. A system according to claim 14 wherein said server sub-system further configured with a processing component for searching and processing received inquiries against the data storage device containing a variety of information collected by the collection component.

17. A system according to claim 14 wherein said server sub-system further configured with a retrieving component to retrieve information from the data storage device.

18. A system according to claim 14 wherein said server sub-system further configured with an information fulfillment component that downloads the requested information after retrieving from the database to the plurality of users in the order in which the requests were received by the receiving component.

19. A system according to claim 14 wherein said server sub-system further configured to print requested information.

20. A system according to claim 14 wherein said server sub-system further configured to accept an inquiry from a user.

21. A system according to claim 14 wherein said server sub-system further configured to:

display information on the subsidiary sub-system; and receive an inquiry from the subsidiary sub-system.

22. A system according to claim 9 wherein said server sub-system further configured to:

display information on the subsidiary sub-system; and receive an inquiry from the subsidiary sub-system.

23. A system according to claim 22 wherein said server sub-system further configured to display an HTML document downloaded by the server sub-system.

24. A system according to claim 22 wherein said server sub-system further configured to display at least one alternative out of various alternatives available to the user.

25. A system according to claim 9 wherein said server sub-system further configured to:

track information on a real time basis; and store information on a real time basis by adding new information to the centralized database on a real time basis to provide up-to date information instantaneously to the user upon a request.

26. A system according to claim 9 wherein said server sub-system further configured to receive information entered on-line.

27. A system according to claim 26 wherein said server sub-system further configured to receive information entered through at least one of a voice activation command and a device connected to the client sub-system.

28. A system according to claim 26 wherein said server sub-system further configured to submit a request through pull down menus.

29. A system according to claim 9 wherein said server sub-system further configured to receive account information by displaying on a subsidiary sub-system at least one of a BSLA, an affiliate BSLA, an Account Number, a Description of the Account, a Treasury Balance indicating the treasury balance booked by a parent corporation, a Business Balance indicating the amount booked by a subsidiary of the parent corporation, a Contact Name of the BSLA selected, a Contact Phone Number of the contact name, a Fiscal Month, a start date of the fiscal month, and an end date of the fiscal month.

30. A system according to claim 9 wherein said server sub-system further configured to receive account information by receiving a variance amount between a business balance and a treasury balance.

31. A system according to claim 9 wherein said server sub-system further configured to receive account information by:

displaying a table for entering information wherein the table includes at least one column prompting a user to input at least one of a dollar amount Booked by Business, a dollar amount Booked by Treasury, a Currency Code, a Conversion Rate, a Description, a date of transaction, an amount identified in Treasury Journal, a Treasury Source relating to the treasury journal, a code for an Office and a Legal Entity.

32. A system according to claim 9 wherein said server sub-system further configured to:
enter against an account identifier at least one of a dollar amount Booked by Business, a dollar amount Booked by Treasury, a Currency Code, a Conversion Rate, a Description, a date of transaction, an amount identified in Treasury Journal, a Treasury Source relating to the treasury journal, a code for an Office and a Legal Entity; and
store against the account identifier at least one of a dollar amount Booked by Business, a dollar amount Booked by Treasury, a Currency Code, a Conversion Rate, a Description, a date of transaction, an amount identified in Treasury Journal, a Treasury Source relating to the treasury journal, a code for an Office and a Legal Entity.

33. A system according to claim 9 wherein said server sub-system further configured to:
compute a new account variance between a business balance and a treasury balance;
download the new account variance; and
display the new account variance.

34. A system according to claim 33 wherein said server sub-system further configured to generate account reconciliation information in a variety of reporting formats.

35. A system according to claim 34 wherein said server sub-system further configured to:
download requested information from said server sub-system; and
display requested information on said subsidiary sub-system in response to the inquiry.

36. A system according to claim 35 wherein said server sub-system further configured to display an HTML document downloaded by said server sub-system.

37. A system according to claim 35 wherein said server sub-system further configured to display at least one alternative from various alternatives available to the user.

38. A system according to claim 35 wherein said server sub-system further configured to:
access the centralized database;
search the database regarding the specific inquiry;
retrieve information from the database; and
transmit the retrieved information to the subsidiary sub-system for display by the subsidiary sub-system.

39. A system according to claim 34 wherein said server sub-system further configured to print requested information.

40. A system according to claim 34 wherein said server sub-system further configured to:
receive an inquiry from a user;
accept the inquiry from a user; and
deliver information to the user in response to the inquiry.

41. A system according to claim 9 wherein said server sub-system further configured to submit a request through pull down menus.

42. A system according to claim 9 wherein said server sub-system further configured to select a method for submitting accounting entries from at least one of an Enter Cash Account Reconciliation and a Down/UpLoad Cash Account Reconciliation.

43. A system according to claim 42 wherein said server sub-system further configured to:
enter a user input against an account identifier at least one of a dollar amount Booked by Business, a dollar amount Booked by Treasury, a Currency Code, a Conversion Rate, a Description, a date of transaction, an amount identified in Treasury Journal, a Treasury Source relating to the treasury journal, a code for an Office and a Legal Entity;
store the user input against the account identifier at least one of a dollar amount Booked by Business, a dollar amount Booked by Treasury, a Currency Code, a Conversion Rate, a Description, a date of transaction, an amount identified in Treasury Journal, a Treasury Source relating to the treasury journal, a code for an Office and a Legal Entity;
upload the user input to update the account information; and
compute a new account variance between a business balance and a treasury balance.

44. A system according to claim 42 wherein said server sub-system further configured to:
create required files associated with the account;
display against an account identifier, at least one of a BSLA, an affiliate BSLA, an Account Number, a Description of the Account, a Treasury Balance indicating the treasury balance booked by a parent corporation, a Business Balance indicating the amount booked by a subsidiary of the parent corporation, a Contact Name of the BSLA selected, a Contact Phone Number of the contact name, a Fiscal Month, a start date of the fiscal month, and an end date of the fiscal month;
display at least one column to allow a user to input at least one of a dollar amount Booked by Business, a dollar amount Booked by Treasury, a Currency Code, a Conversion Rate, a Description, a date of transaction, an amount identified in Treasury Journal, a Treasury Source relating to the treasury journal, a code for an Office and a Legal Entity;
accept a user input against the account identifier and at least one of a dollar amount Booked by Business, a dollar amount Booked by Treasury, a Currency Code, a Conversion Rate, a Description, a date of transaction, an amount identified in Treasury Journal, a Treasury Source relating to the treasury journal, a code for an Office and a Legal Entity; and
store the user input against the account identifier and at least one of a dollar amount Booked by Business, a dollar amount Booked by Treasury, a Currency Code, a Conversion Rate, a Description, a date of transaction, an amount identified in Treasury Journal, a Treasury Source relating to the treasury journal, a code for an Office and a Legal Entity.

45. A system according to claim 44 wherein said server sub-system further configured to:
upload the user input to update the account information; and
compute a new account variance between a business balance and a treasury balance.

46. A system according to claim 9 wherein said server sub-system further configured to connect to the subsidiary sub-system via a network and wherein the network is one of a wide area network, a local area network, an intranet and the Internet.

47. A network based account reconciliation system for reconciling accounts between a parent business entity and a subsidiary of the parent business entity, said account reconciliation system coupled to a centralized database, said system comprising:

a client sub-system associated with the subsidiary, the client sub-system including a browser and configured to prompt a user associated with the subsidiary to enter account data relating to the business activities of the subsidiary;

a remote computer associated with the parent, the parent computer programmed to prompt a user associated with the parent to enter account data relating to the business activities of the subsidiary;

a data storage device for storing account information including account data maintained by the parent relating to business activities of the subsidiary, account data maintained by the subsidiary relating to the business activities of the subsidiary, and variance data showing differences between the parent maintained account data and the subsidiary maintained account data;

a server sub-system configured to be coupled to each of said client sub-system, said parent computer, and said database, said server sub-system programmed to:

receive the parent maintained account data from the parent computer;

receive the subsidiary maintained account data from the client sub-system;

calculate an account variance based on the parent maintained account data and the subsidiary maintained account data;

report the account variance to a user associated with the subsidiary by displaying on the client sub-system the account variance, an amount booked by the parent, and an amount booked by the subsidiary;

display a data entry table on the at least one subsidiary sub-system for prompting the user associated with the subsidiary to input additional accounting entries for reconciling the reported account variance, wherein the additional accounting entries include at least one of an amount booked by the subsidiary, an amount booked by the parent, a currency code, a conversion rate, a local amount, a transaction date, and an amount identified in a journal of the parent;

display on the at least one subsidiary sub-system guidelines to assist the user associated with the subsidiary to input the additional accounting entries in the displayed data table, wherein the specific guidelines displayed depend upon accounting standards applicable to the parent and accounting standards applicable to the subsidiary and whether any differences exist between the applicable accounting standards including whether differences in accounting standards exist due to the parent and subsidiary being located in different countries;

reconcile the account variance by processing the additional accounting entries inputted into the data entry table relating to the business activities of the subsidiary;

automatically compare the additional accounting entries to the account data stored in the data storage device to determine whether any of the additional accounting entries are duplicative of the account data stored in the data storage device;

automatically update the account variance and the amount booked by the subsidiary as displayed on the client sub-system based on the additional, non-duplicative accounting entries; and update the account information stored in the data storage device and the account variance based on the additional, non-duplicative accounting entries.

48. A system according to claim 47 wherein said server sub-system is further programmed to display guidelines relating to at least one of a timing of recording items including whether there are time lags between a time when the parent records an account receivable or an account payable associated with the subsidiary and a time when the subsidiary records the same account receivable or account payable, methods used for reporting account information including whether the parent account data and the subsidiary account data are based on a cash basis or an accrual basis, a discrepancy in an amount, exchange rates used by the parent and subsidiary, whether at least one of an overhead charge and a management fee has been charged to the subsidiary by the parent, and whether there have been any improper entries charged to the subsidiary.

49. A system according to claim 47 wherein said server sub-system further configured to receive and store at least one of a user's account balance information and reconciliation information.

50. A system according to claim 47 wherein said server sub-system further configured to receive the account information via at least one of an intranet, the Internet, a local area network, and a wide area network.

* * * * *